United States Patent
Cornille et al.

(10) Patent No.: US 11,760,128 B2
(45) Date of Patent: Sep. 19, 2023

(54) HIGHLY COMPRESSIBLE OPEN CORD

(71) Applicant: COMPAGNIE GENERALE DES ETABLISSEMENTS MICHELIN, Clermont-Ferrand (FR)

(72) Inventors: Richard Cornille, Clermont-Ferrand (FR); Henri Barguet, Clermont-Ferrand (FR)

(73) Assignee: COMPAGNIE GENERALE DES ETABLISSEMENTS MICHELIN, Clermont-Ferrand (FR)

( * ) Notice: Subject to any disclaimer, the term of this patent is extended or adjusted under 35 U.S.C. 154(b) by 367 days.

(21) Appl. No.: 17/262,816

(22) PCT Filed: Jul. 25, 2019

(86) PCT No.: PCT/EP2019/070032
§ 371 (c)(1),
(2) Date: Jan. 25, 2021

(87) PCT Pub. No.: WO2020/021006
PCT Pub. Date: Jan. 30, 2020

(65) Prior Publication Data
US 2021/0309050 A1    Oct. 7, 2021

(30) Foreign Application Priority Data

Jul. 25, 2018  (FR) ...................................... 1856914

(51) Int. Cl.
*B60C 9/00*    (2006.01)
*B60C 9/22*    (2006.01)
*D07B 1/06*    (2006.01)

(52) U.S. Cl.
CPC .............. *B60C 9/0007* (2013.01); *B60C 9/22* (2013.01); *D07B 1/062* (2013.01); *D07B 1/0646* (2013.01);
(Continued)

(58) Field of Classification Search
CPC ......... B60C 9/0007; B60C 9/22; D07B 1/062; D07B 1/0646
See application file for complete search history.

(56) References Cited

U.S. PATENT DOCUMENTS 3,327,753 A    6/1967   Travers
4,333,306 A *  6/1982   Yamashita ............. D07B 1/062
                                                    57/902

(Continued)

FOREIGN PATENT DOCUMENTS

CN    2736404 Y     10/2005
EP    0143767 A1    6/1985
(Continued)

OTHER PUBLICATIONS

International Search Report dated Oct. 8, 2019, in corresponding PCT/EP2019/070032 (6 pages).

*Primary Examiner* — Shaun R Hurley
(74) *Attorney, Agent, or Firm* — VENABLE LLP

(57) ABSTRACT

A cord (50) comprises a single layer (52) of helically wound metal filamentary elements (54). The metal filamentary elements define an internal enclosure (58) of the cord of diameter Dv. Each metal filamentary element (54) has a diameter Df and a helix radius of curvature Rf. With Dv, Df and Rf being expressed in millimetres, the cord satisfies the following relationships: $9 \leq Rf/Df \leq 30$ and $1.30 \leq Dv/Df \leq 2.10$.

15 Claims, 7 Drawing Sheets

(52) U.S. Cl.
CPC .............. *B60C 2009/228* (2013.01); *B60C 2009/2285* (2013.01); *D07B 2201/2022* (2013.01); *D07B 2201/2029* (2013.01); *D07B 2201/2039* (2013.01); *D07B 2501/2046* (2013.01)

(56) References Cited

U.S. PATENT DOCUMENTS

| | | | | |
|---|---|---|---|---|
| 5,319,915 | A * | 6/1994 | Kobayashi | D07B 3/10 57/902 |
| 5,502,960 | A * | 4/1996 | Kobayashi | B60C 9/0057 57/902 |
| 5,533,327 | A | 7/1996 | Mbert | |
| 6,065,518 | A * | 5/2000 | Miyawaki | B60C 9/0057 57/902 |
| 6,089,293 | A * | 7/2000 | Niderost | B60C 9/22 152/526 |
| 7,975,463 | B2 * | 7/2011 | Cristofani | D07B 1/0646 57/311 |
| 10,364,529 | B2 | 7/2019 | Calvet et al. | |
| 10,378,128 | B2 | 8/2019 | Calvet et al. | |
| 2003/0221762 | A1 * | 12/2003 | Miyazaki | D07B 1/0646 57/236 |
| 2006/0027310 | A1 | 2/2006 | Auclair | |
| 2007/0006957 | A1 | 1/2007 | Nakajima | |
| 2009/0176119 | A1 | 7/2009 | Cristofani et al. | |
| 2017/0321352 | A1 | 11/2017 | Calvet et al. | |
| 2017/0321376 | A1 | 11/2017 | Calvet et al. | |
| 2018/0117970 | A1 | 5/2018 | Le Clerc et al. | |
| 2018/0171551 | A1 * | 6/2018 | Calvet | D07B 1/0613 |
| 2022/0258535 | A1 | 8/2022 | Barguet et al. | |

FOREIGN PATENT DOCUMENTS

| | | |
|---|---|---|
| EP | 0548539 A2 | 6/1993 |
| EP | 0622489 A1 | 11/1994 |
| EP | 1000194 A1 | 5/2000 |
| EP | 1623819 A1 | 2/2006 |
| FR | 1413102 A | 10/1965 |
| JP | 6-346386 A | 12/1994 |
| JP | 10-35215 A | 2/1998 |
| JP | 2007-92259 A | 4/2007 |
| WO | 2007/128335 A1 | 11/2007 |
| WO | 2012/055677 A2 | 5/2012 |
| WO | 2016/083265 A1 | 6/2016 |
| WO | 2016/083267 A1 | 6/2016 |
| WO | 2016/166056 A1 | 10/2016 |
| WO | 2016/189073 A1 | 12/2016 |

\* cited by examiner

HIGHLY COMPRESSIBLE OPEN CORD

BACKGROUND

The present invention relates to metal cords that are usable for reinforcing articles such as tyres for vehicles. A tyre is understood to mean a casing intended to form a cavity by cooperating with a support element, for example a rim, this cavity being able to be pressurized to a pressure higher than atmospheric pressure. A tyre according to the invention has a structure of substantially toroidal shape.

A metal cord comprising a single layer of N=5 helically wound metal filamentary elements is known from the prior art. Each metal filamentary element is made up of a steel monofilament and has a diameter equal to 0.38 mm. Each metal filamentary element is wound at a pitch P=6.7 mm and is individually preformed before the final helical assembly step of the metal filamentary elements. The metal filamentary elements define an internal enclosure of the cord. The preforming and internal enclosure give the cord, once assembled, relatively significant aeration, in other words a relatively large space between each pair of adjacent metal filamentary elements. Such aeration causes structural elongation As of the cord equal to 2.3%. Such a cord is intended in particular to be used in tyres, for example tyres for a vehicle of the heavy-duty type.

In addition to requiring a step of individually preforming the metal filamentary elements, this prior art cord has relatively low longitudinal compressibility, meaning that the cord buckles under a relatively low longitudinal compressive deformation. Such buckling manifests itself in local bending of the cord, not only causing the rigidity in compression of the cord to drop but also leading to a risk of the metal filamentary elements being damaged under the cycling effects to which for example tyres are subjected.

Another example of a metal cord comprising a single layer of helically wound metal filamentary elements is described in WO2016/166056. In WO2016/166056, a cord 3.26 comprises a single layer of N=3 helically wound metal filamentary elements, each metal filamentary element being made up of a steel monofilament and having a diameter equal to 0.26 mm. Just like the above-described cord 5.38, the cord 3.26 in WO2016/166056 exhibits relatively low longitudinal compressibility.

The aim of the invention is to propose cords comprising a single layer of N helically wound metal filamentary elements exhibiting both excellent longitudinal compressibility and a relatively small diameter compared with the diameters of the metal filamentary elements of which it is made up.

SUMMARY

To this end, a subject of the invention is a cord comprising a single layer of helically wound metal filamentary elements, each metal filamentary element of the layer describing, when the cord extends in a substantially rectilinear direction, a helical path about a main axis substantially parallel to the substantially rectilinear direction, such that, in a section plane substantially perpendicular to the main axis, the distance between the centre of each metal filamentary element of the layer and the main axis is equal to half the helix diameter Dh and is substantially constant and identical for all the metal filamentary elements of the layer, the metal filamentary elements defining an internal enclosure of the cord of diameter Dv, each metal filamentary element having a diameter Df and a helix radius of curvature Rf, wherein, with Dh, Dv, Df and Rf being expressed in millimetres, the cord satisfies the following relationships:

$$9 \leq Rf/Df \leq 30, \text{ and}$$

$$1.30 \leq Dv/Df \leq 2.10.$$

The cord according to the invention exhibits, as demonstrated by the comparative tests described below, excellent longitudinal compressibility and, all other things being equal, a relatively small diameter.

The inventors behind the invention postulate that, on account of a sufficiently large radius of curvature Rf with respect to the diameter Df of each metal filamentary element, the cord is sufficiently aerated, thereby reducing the risk of buckling, on account of the relatively large spacing of each metal filamentary element from the longitudinal axis of the cord, this spacing allowing the metal filamentary elements, on account of their helix, to adapt to relatively high longitudinal compressive deformations. By contrast, since the radius of curvature Rf of each metal filamentary element of the prior art cord is relatively small with respect to the diameter Df, the metal filamentary elements are closer to the longitudinal axis of the cord and can, on account of their helix, adapt to much lower longitudinal compressive deformations than the cord according to the invention.

Moreover, in the case of too large a radius of curvature Rf of each metal filamentary element, the cord according to the invention would have insufficient longitudinal stiffness in compression to ensure a reinforcing role, for example for tyres.

In addition, in the case of too large an internal enclosure diameter Dv, the cord would have too large a diameter relative to the diameter of the metal filamentary elements. By contrast, in the case of too small an internal enclosure diameter Dv, the cord would have too little space between the metal filamentary elements for the latter to be able to adapt to relatively high longitudinal compressive deformations without buckling.

The values of the characteristics Dh, Df, Dv and Rf and of the other characteristics described below are measured on or determined from cords either directly after they have been manufactured, that is to say before any step of embedding in an elastomeric matrix, or once they have been extracted from an elastomeric matrix, for example of a tyre, and have thus undergone a cleaning step during which any elastomeric matrix is removed from the cord, in particular any material present inside the cord. In order to ensure an original state, the adhesive interface between each metal filamentary element and the elastomeric matrix has to be eliminated, for example by way of an electrochemical process in a bath of sodium carbonate. The effects associated with the shaping step of the method for manufacturing the tyre that are described below, in particular the elongation of the cords, are eliminated by the extraction of the ply and of the cord which, during extraction, substantially regain their characteristics from before the shaping step.

The cord according to the invention comprises a single layer of helically wound metal filamentary elements. In other words, the cord according to the invention comprises one layer, not two or more than two layers, of helically wound metal filamentary elements. The layer is made of metal filamentary elements, that is to say a plurality of metal filamentary elements, not just one metal filamentary element. In one embodiment of the cord, for example when the cord has completed its manufacturing process, the cord according to the invention is made up of the layer of wound metal filamentary elements; in other words, the cord does not comprise any other metal filamentary element than those in the layer.

The cord according to the invention has a single helix. By definition, a single-helix cord is a cord in which the axis of each metal filamentary element of the layer describes a single helix, in contrast to a double-helix cord, in which the axis of each metal filamentary element describes a first helix about the axis of the cord and a second helix about a helix described by the axis of the cord. In other words, when the cord extends in a substantially rectilinear direction, the cord comprises a single layer of metal filamentary elements wound together in a helix, each metal filamentary element of the layer describing a helical path about a main axis substantially parallel to the substantially rectilinear direction, such that, in a section plane substantially perpendicular to the main axis, the distance between the centre of each metal filamentary element of the layer and the main axis is substantially constant and identical for all the metal filamentary elements of the layer. By contrast, when a double-helix cord extends in a substantially rectilinear direction, the distance between the centre of each metal filamentary element of the layer and the substantially rectilinear direction is different for all of the metal filamentary elements of the layer.

The cord according to the invention does not have a central metal core. This is also referred to as a cord of structure 1×N, in which N is the number of metal filamentary elements, or as an open cord. In the cord according to the invention that is defined above, the internal enclosure is empty and thus does not have any filling material, in particular does not have any elastomeric composition. This is thus referred to as a cord without filling material.

The enclosure in the cord according to the invention is delimited by the metal filamentary elements and corresponds to the volume delimited by a theoretical circle that is, for the one part, radially on the inside of each metal filamentary element and, for the other part, tangent to each metal filamentary element. The diameter of this theoretical circle is equal to the enclosure diameter Dv.

A filamentary element means an element extending longitudinally along a main axis and having a section perpendicular to the main axis, the largest dimension G of which is relatively small compared with the dimension L along the main axis. The expression relatively small means that L/G is greater than or equal to 100, preferably greater than or equal to 1000. This definition covers both filamentary elements with a circular section and filamentary elements with a non-circular section, for example a polygonal or oblong section. Very preferably, each metal filamentary element has a circular section.

By definition, the term metal means a filamentary element made up mostly (i.e. more than 50% of its weight) or entirely (100% of its weight) of a metal material. Each metal filamentary element is preferably made of steel, more preferably pearlitic or ferritic-pearlitic carbon steel, commonly referred to as carbon steel by a person skilled in the art, or made of stainless steel (by definition steel comprising at least 10.5% chromium).

The structural elongation As, which is a parameter well known to a person skilled in the art, is determined for example by applying the standard ASTM D2969-04 of 2014 to a cord tested so as to obtain a force-elongation curve. As is deduced from the curve obtained as the elongation, in %, corresponding to the maximum gradient of the force-elongation curve. It will be recalled that a force-elongation curve comprises, in the direction of increasing elongations, a structural portion, an elastic portion and a plastic portion. The structural portion corresponds to the structural elongation As resulting from the aeration of the cord, that is to say the empty space between the various metal filamentary elements that make up the cord. The elastic portion corresponds to an elastic elongation that results from the construction of the cord, in particular of the angles of the various layers and of the diameters of the threads. The plastic portion corresponds to the plastic elongation that results from the plasticity (irreversible deformation beyond the elastic limit) of one or more metal filamentary elements.

The helix angle $\alpha$ is a parameter that is well known to a person skilled in the art and can be determined using the following iterative calculation comprising three iterations and wherein the index i indicates the number of the iteration 1, 2 or 3. Knowing the structural elongation As expressed in %, the helix angle $\alpha(i)$ is such that $\alpha(i)=\text{Arcos}\,[(100/(100+\text{As})\times\text{Cos}\,[\text{Arctan}\,((\pi\times Df)/(P\times\text{Cos}(\alpha(i-1))\times\text{Sin}(\pi/N))]]$, in which formula P is the pitch expressed in millimetres at which each metal filamentary element is wound, N is the number of metal filamentary elements in the layer, Df is the diameter of each metal filamentary element expressed in millimetres, Arcos, Cos and Arctan and Sin denote the arccosine, cosine, arctangent and sine functions, respectively. For the first iteration, that is to say for the calculation of $\alpha(1)$, $\alpha(0)=0$. At the third iteration, $\alpha(3)=\alpha$ is obtained with at least one significant digit after the decimal point when $\alpha$ is expressed in degrees.

The helix diameter Dh, expressed in millimetres, is calculated using the relationship $Dh=P\times\text{Tan}(\alpha)/\pi$, in which P is the pitch expressed in millimetres at which each metal filamentary element is wound, $\alpha$ is the helix angle of each metal filamentary element determined above, and Tan is the tangent function. The helix diameter Dh corresponds to the diameter of the theoretical circle passing through the centres of the metal filamentary elements of the layer in a plane perpendicular to the main axis of the cord.

The enclosure diameter Dv, expressed in millimetres, is calculated using the relationship $Dv=Dh-Df$, in which Df is the diameter of each metal filamentary element and Dh is the helix diameter, both expressed in millimetres.

The radius of curvature Rf, expressed in millimetres, is calculated using the relationship $Rf=P/(\pi\times\text{Sin}(2\alpha))$, in which P is the pitch expressed in millimetres of each metal filamentary element, a is the helix angle of each metal filamentary element, and Sin is the sine function.

It will be recalled that the pitch at which each metal filamentary element is wound is the length covered by this filamentary element, measured parallel to the axis of the cord in which it is located, after which the filamentary element that has this pitch has made a complete turn about said axis of the cord.

The optional characteristics described below could be combined with one another in so far as such combinations are technically compatible.

In an advantageous embodiment, all the metal filamentary elements have the same diameter Df.

The cord is manufactured in accordance with a method and employing an installation that are described in the documents WO2016083265 and WO2016083267. Such a method implementing a splitting step should be distinguished from a conventional cabling method comprising a single assembly step in which the metal filamentary elements are wound in a helix, the assembly step being preceded by a step of individually preforming each metal filamentary element in order in particular to increase the value of the structural elongation. Such methods and installations are described in the documents EP0548539, EP1000194, EP0622489, WO2012055677, JP2007092259, WO2007128335, JPH06346386 or EP0143767. During these methods, in order to obtain the greatest possible structural elongation, the metal monofilaments are individually preformed. However, this step of individually preforming the metal monofilaments, which requires a particular installation, not only makes the method relatively unproductive compared with a method without an individual preforming step, without otherwise making it possible to achieve great structural elongations, but also has a negative impact on the metal monofilaments preformed in this way on account of rubbing against the preforming tools. Such a negative impact creates rupture initiators at the surface of the metal monofilaments and is therefore detrimental to the endurance of the metal monofilaments, in particular to their endurance under compression. The absence or the presence of such preforming marks is observable under an electron microscope after the manufacturing method, or more simply by knowing the method for manufacturing the cord.

On account of the method used, each metal filamentary element of the cord is without a preforming mark. Such preforming marks include in particular flats. The preforming marks also include cracks extending in section planes substantially perpendicular to the main axis along which each metal filamentary element extends. Such cracks extend, in a section plane substantially perpendicular to the main axis, from a radially external surface of each metal filamentary element radially towards the inside of each metal filamentary element. As described above, such cracks are initiated by the mechanical preforming tools on account of the bending loads, that is to say perpendicularly to the main axis of each metal filamentary element, making them highly detrimental to endurance. By contrast, in the method described in WO2016083265 and WO2016083267, in which the metal filamentary elements are preformed collectively and simultaneously on a temporary centre, the preforming loads are exerted in torsion and therefore not perpendicularly to the main axis of each metal filamentary element. Any cracks created do not extend radially from the radially external surface of each metal filamentary element radially towards the inside of each metal filamentary element but along the radially external surface of each metal filamentary element, making them less detrimental to endurance.

Any range of values denoted by the expression "between a and b" represents the range of values from more than a to less than b (i.e. excluding the limits a and b), whereas any range of values denoted by the expression "from a to b" means the range of values from a up to b (i.e. including the strict limits a and b).

A radial cross section or radial section means here a cross section or a section in a plane that contains the axis of rotation of the tyre.

The expression axial direction means the direction substantially parallel to the axis of rotation of the tyre.

The expression circumferential direction means the direction that is substantially perpendicular both to the axial direction and to a radius of the tyre (in other words, tangent to a circle centred on the axis of rotation of the tyre).

The expression radial direction means the direction along a radius of the tyre, namely any direction that intersects the axis of rotation of the tyre and is substantially perpendicular to that axis.

The median plane (denoted M) is the plane perpendicular to the axis of rotation of the tyre that is situated mid-way between the two beads and passes through the middle of the crown reinforcement.

The equatorial circumferential plane (denoted E) of the tyre is the theoretical plane passing through the equator of the tyre, perpendicular to the median plane and to the radial direction. The equator of the tyre is, in a circumferential section plane (plane perpendicular to the circumferential direction and parallel to the radial and axial directions), the axis that is parallel to the axis of rotation of the tyre and located equidistantly between the radially outermost point of the tread that is intended to be in contact with the ground and the radially innermost point of the tyre that is intended to be in contact with a support, for example a rim, the distance between these two points being equal to H.

The orientation of an angle means the direction, clockwise or anticlockwise, in which it is necessary to rotate from a reference straight line, in this case the circumferential direction of the tyre, defining the angle in order to reach the other straight line defining the angle.

In preferred embodiments, $11 \leq Rf/Df \leq 19$.

In preferred embodiments, $1.30 \leq Dv/Df \leq 2.05$ and more preferably $1.30 \leq Dv/Df \leq 2.00$.

Advantageously, the helix radius of curvature Rf is such that $2 \text{ mm} \leq Rf \leq 7 \text{ mm}$.

In one embodiment of a cord intended to reinforce a tyre for passenger vehicles, but also for two-wheel vehicles such as motorcycles, and preferably for passenger vehicles, $2 \text{ mm} \leq Rf \leq 5 \text{ mm}$ and preferably $3 \text{ mm} \leq Rf \leq 5 \text{ mm}$.

In one embodiment of a cord intended to reinforce a tyre for industrial vehicles chosen from vans, heavy-duty vehicles, for example light rail vehicles, buses, heavy road transport vehicles (lorries, tractors, trailers), $4 \text{ mm} \leq Rf \leq 6 \text{ mm}$ and preferably $4 \text{ mm} \leq Rf \leq 5 \text{ mm}$.

In one embodiment of a cord intended to reinforce a tyre for off-road vehicles, for example agricultural or construction plant vehicles, $4 \text{ mm} \leq Rf \leq 7 \text{ mm}$ and preferably $4.5 \text{ mm} \leq Rf \leq 6.5 \text{ mm}$.

Advantageously, the helix diameter Dh of each metal filamentary element is such that $0.40 \text{ mm} \leq Dh \leq 1.50 \text{ mm}$.

In one embodiment of a cord intended to reinforce a tyre for passenger vehicles, but also for two-wheel vehicles such as motorcycles, and preferably for passenger vehicles, $0.50 \text{ mm} \leq Dh \leq 1.00 \text{ mm}$ and preferably $0.70 \text{ mm} \leq Dh \leq 1.00 \text{ mm}$.

In one embodiment of a cord intended to reinforce a tyre for industrial vehicles chosen from vans, heavy-duty vehicles, for example light rail vehicles, buses, heavy road transport vehicles (lorries, tractors, trailers), $0.85 \text{ mm} \leq Dh \leq 1.20 \text{ mm}$ and preferably $0.90 \text{ mm} \leq Dh \leq 1.15 \text{ mm}$.

In one embodiment of a cord intended to reinforce a tyre for off-road vehicles, for example agricultural or construction plant vehicles, $0.95 \text{ mm} \leq Dh \leq 1.40 \text{ mm}$ and preferably $1.00 \text{ mm} \leq Dh \leq 1.35 \text{ mm}$.

Advantageously, Df is such that $0.10 \text{ mm} \leq Df \leq 0.50 \text{ mm}$.

In one embodiment of a cord intended to reinforce a tyre for passenger vehicles, but also for two-wheel vehicles such as motorcycles, and preferably for passenger vehicles, $0.20 \text{ mm} \leq Df \leq 0.35 \text{ mm}$ and preferably $0.25 \text{ mm} \leq Df \leq 0.33 \text{ mm}$.

In one embodiment of a cord intended to reinforce a tyre for industrial vehicles chosen from vans, heavy-duty vehicles, for example light rail vehicles, buses, heavy road transport vehicles (lorries, tractors, trailers), $0.22 \text{ mm} \leq Df \leq 0.40 \text{ mm}$ and preferably $0.25 \text{ mm} \leq Df \leq 0.38 \text{ mm}$.

In one embodiment of a cord intended to reinforce a tyre for off-road vehicles, for example agricultural or construction plant vehicles, 0.32 mm≤Df≤0.50 mm and preferably 0.35 mm≤Df≤0.50 mm.

Advantageously, Dv is such that Dv≥0.46 mm.

In one embodiment of a cord intended to reinforce a tyre for passenger vehicles, but also for two-wheel vehicles such as motorcycles, and preferably for passenger vehicles, 0.46 mm≤Dv≤0.70 mm.

In one embodiment of a cord intended to reinforce a tyre for industrial vehicles chosen from vans, heavy-duty vehicles, for example light rail vehicles, buses, heavy road transport vehicles (lorries, tractors, trailers), 0.50 mm≤Dv≤0.80 mm.

In one embodiment of a cord intended to reinforce a tyre for off-road vehicles, for example agricultural or construction plant vehicles, 0.55 mm≤Dv≤1.00 mm.

Advantageously, each metal filamentary element is wound at a pitch P such that 3 mm≤P≤15 mm.

In one embodiment of a cord intended to reinforce a tyre for passenger vehicles, but also for two-wheel vehicles such as motorcycles, and preferably for passenger vehicles, 3 mm≤P≤9 mm.

In one embodiment of a cord intended to reinforce a tyre for industrial vehicles chosen from vans, heavy-duty vehicles, for example light rail vehicles, buses, heavy road transport vehicles (lorries, tractors, trailers), 7 mm≤P≤15 mm.

In one embodiment of a cord intended to reinforce a tyre for off-road vehicles, for example agricultural or construction plant vehicles, 9 mm≤P≤15 mm.

Advantageously, the cord has a diameter D such that D≤2.00 mm.

The diameter or visible diameter, denoted D, is measured by means of a thickness gauge, the diameter of the contacts of which is at least equal to 1.5 times the winding pitch P of the filamentary elements (the model JD50 from Kaefer may be mentioned for example, which makes it possible to achieve a precision of 1/100 of a millimetre, is equipped with a type a contact, and has a contact pressure of around 0.6 N). The measurement protocol consists of three repetitions of a set of three measurements (carried out perpendicularly to the axis of the cord and under zero tension), wherein the second and third of these measurements are carried out in a direction offset angularly from the previous measurement by one third of a turn, by rotation of the measurement direction about the axis of the cord.

In one embodiment of a cord intended to reinforce a tyre for passenger vehicles, but also for two-wheel vehicles such as motorcycles, and preferably for passenger vehicles, 0.75 mm≤D≤1.40 mm and preferably 1.00 mm≤D≤1.30 mm.

In one embodiment of a cord intended to reinforce a tyre for industrial vehicles chosen from vans, heavy-duty vehicles, for example light rail vehicles, buses, heavy road transport vehicles (lorries, tractors, trailers), 1.15 mm≤D≤1.55 mm.

In one embodiment of a cord intended to reinforce a tyre for off-road vehicles, for example agricultural or construction plant vehicles, 1.5 mm≤D≤2 mm.

In one embodiment, each metal filamentary element comprises a single metal monofilament. Here, each metal filamentary element is advantageously made up of a metal monofilament. In a variant of this embodiment, the metal monofilament is directly coated with a layer of a metal coating comprising copper, zinc, tin, cobalt or an alloy of these metals, for example brass or bronze. In this variant, each metal filamentary element is then made up of the metal monofilament, made for example of steel, forming a core, which is directly coated with the metal coating layer.

In this embodiment, each metal elementary monofilament is, as described above, preferably made of steel, and has a mechanical strength ranging from 1000 MPa to 5000 MPa. Such mechanical strengths correspond to the steel grades commonly encountered in the field of tyres, namely the NT (Normal Tensile), HT (High Tensile), ST (Super Tensile), SHT (Super High Tensile), UT (Ultra Tensile), UHT (Ultra High Tensile) and MT (Mega Tensile) grades, the use of high mechanical strengths potentially allowing improved reinforcement of the matrix in which the cord is intended to be embedded and lightening of the matrix reinforced in this way.

Advantageously, with the layer being made up of N helically wound metal filamentary elements, N ranges from 3 to 6.

Advantageously, the ratio K of the pitch P to the diameter Df of each metal filamentary element, P and Df being expressed in millimetres, is such that 19≤K≤44.

Advantageously, the helix angle α of each metal filamentary element is such that 13°≤α≤21°.

In the case of values of the ratio K that are too high or in the case of values of the helix angle that are too low, the longitudinal compressibility of the cord is reduced. In the case of values of the ratio K that are too low or in the case of values of the helix angle that are too high, the longitudinal stiffness of the cord and thus its reinforcement capability are reduced.

Advantageously, the cord has a structural elongation As such that As≥1%, preferably As≥2.5%, more preferably As≥3% and even more preferably 3%≤As≤5.5%, the structural elongation As being determined by applying the standard ASTM D2969-04 of 2014 to the cord so as to obtain a force-elongation curve, the structural elongation As being equal to the elongation, in %, corresponding to the maximum gradient of the force-elongation curve.

Advantageously, each metal filamentary element is without preforming marks. In other words, the cord is obtained by a method that does not have steps of individually preforming each of the metal filamentary elements.

As described above, the cord according to the invention is manufactured in accordance with a method and employing an installation that are described in the documents WO2016083265 and WO2016083267. This method comprises a step of assembling by twisting a temporary assembly comprising M metal filamentary elements, during which the M metal filamentary elements are preformed collectively and simultaneously on a temporary centre, followed by a step of separating the temporary assembly between the temporary centre and the cord according to the invention, during which the temporary assembly is separated between the temporary centre and at least a portion of the M metal filamentary elements of the temporary assembly to form the cord according to the invention. More specifically, such a method comprises a step of assembling M metal filamentary elements together in a layer of M metal filamentary elements about a temporary centre in order to form a temporary assembly, and a step of splitting the temporary assembly into at least first and second assemblies of M1 metal filamentary elements and M2 metal filamentary elements. At least one of the first and second assemblies then forms the cord according to the invention, i.e. M1=N and/or M2=N.

On account of the elastic return of each metal filamentary element in response to the twisting step, the pitch of each metal filamentary element of the temporary assembly passes from a temporary pitch to the pitch P that is greater than said temporary pitch. A person skilled in the art knows how to determine the temporary pitch to be applied in order to obtain the desired pitch P.

In a similar manner, the helix diameter Dh of each metal filamentary element in the cord is substantially greater than the temporary helix diameter of each filamentary element in the temporary assembly, on account of the elastic return. The helix diameter Dh of each metal filamentary element in the cord is all the greater than the temporary helix diameter of each filamentary element in the temporary assembly, the greater the degree of twist is. A person skilled in the art knows how to determine the temporary helix diameter to be applied in order to obtain the desired helix diameter Dh, depending on the degree of twist and on the nature of the temporary centre. The same goes for the enclosure diameter Dv.

Advantageously, in a first embodiment, the step of splitting the temporary assembly comprises a step of separating the temporary centre of the first and second assemblies. In this embodiment, the first assembly is made up of M1 metal filamentary elements that are wound together and distributed in a single layer about the axis of the first assembly. Similarly, the second assembly of this embodiment is made up of M2 metal filamentary elements that are wound together and distributed in a single layer about the axis of the second assembly. In other words, in this first embodiment, with the temporary centre comprising at least one filamentary element, each filamentary element of the temporary centre does not belong to the first and second assemblies of M1 metal filamentary elements and M2 metal filamentary elements. Therefore, M1+M2=M.

In a first preferred variant of this first embodiment, during the splitting step, the first assembly is separated from a temporary unit formed by the second assembly and the temporary centre, and then the second assembly and the temporary centre are separated from one another. In a second variant, during the splitting step, the temporary centre, the first assembly and the second assembly are separated simultaneously from one another in pairs.

Advantageously, the method comprises a step of recycling the temporary centre, during which:
the temporary centre is recovered downstream of the splitting step, and
the previously recovered temporary centre is introduced upstream of the assembly step.

In a preferred embodiment, the step of recycling the temporary centre can be effected continuously, meaning that the temporary centre leaving the separation step is reintroduced, without an intermediate step of storing the temporary centre, into the assembly step. In another embodiment, the step of recycling the temporary centre is discontinuous, meaning that there is an intermediate step of storing the temporary centre.

More preferably, a textile temporary centre is used.

In a second embodiment, the step of splitting the temporary assembly comprises a step of splitting the temporary centre between at least the first and second assemblies. Thus, in this second embodiment, two assemblies of metal filamentary elements are obtained, each comprising a layer respectively of P1, P2 metal filamentary elements wound together in a helix, and for at least one of the assemblies, a central core comprising or made up of at least a portion of the temporary centre about which the metal filamentary elements of the layer are wound. In other words, in this second embodiment, with the temporary centre comprising K metal filamentary element(s), at least one of the K metal filamentary element(s) of the temporary centre belongs to at least one of the first and second assemblies of M1 metal filamentary elements and M2 metal filamentary elements.

Advantageously, during the splitting step, at least a first portion of the temporary centre is split with first metal filamentary elements of the temporary assembly so as to form the first assembly.

Thus, the first assembly comprises a layer of P1 metal filamentary elements wound together in a helix and a central core comprising or made up of a first portion (K1 filamentary element(s)) of the K metal filamentary elements of the temporary centre and about which the P1 metal filamentary elements are wound together in a helix. P1+K1=M1.

Advantageously, during the splitting step, at least a second portion of the temporary centre is split with second metal filamentary elements of the temporary assembly so as to form the second assembly.

Thus, the second assembly comprises a layer of P2 metal filamentary elements wound together in a helix and a central core comprising or made up of a second portion (K2 filamentary element(s)) of the K filamentary elements of the temporary centre and about which the P2 metal filamentary elements are wound together in a helix. P2+K2=M2.

Preferably, the first and second assemblies are formed simultaneously.

Preferably, before the splitting step, the first and second portions of the temporary centre make up the temporary centre. Thus, the first and second portions of the temporary centre are complementary. Therefore, K1+K2=K. In a variant, it could be that K1+K2≤K.

In a variant, the first assembly comprises a layer of P1 metal filamentary elements wound together in a helix about a central core comprising or made up of the temporary centre and the second assembly comprises a layer of P2=M2 metal filamentary elements wound together in a helix and without a central core.

In one embodiment, the assembly step is carried out by twisting. In such a case, the metal filamentary elements undergo both a collective twist and an individual twist about their own axis, thereby generating an untwisting torque on each of the metal filamentary elements. In another embodiment, the assembly step is carried out by cabling. In this case, the metal filamentary elements undergo no twisting about their own axis, on account of a synchronous rotation before and after the assembly point.

Preferably, in the case of a twisting assembly step, the method comprises a step of balancing the temporary assembly. Thus, with the balancing step being carried out on the assembly made up of the M metal filamentary elements and the temporary centre, the balancing step is implicitly carried out upstream of the splitting step.

Advantageously, the method comprises a step of balancing at least one of the first and second assemblies after the splitting step.

Advantageously, the method comprises a step of maintaining the rotation of the first and second assemblies about their respective directions of travel. This step is carried out after the splitting step and before the step of balancing at least one of the first and second assemblies.

A further subject of the invention is the use of such a cord for reinforcing semifinished products or articles comprising an elastomeric matrix in which the cord is embedded.

Such semifinished products or articles are pipes, belts, conveyor belts, tracks, tyres for vehicles, both in the uncured state (that is to say before crosslinking or vulcanization) and in the cured state (after crosslinking or vulcanization). In preferred embodiments, such semifinished products or articles take the form of a ply.

A further subject of the invention is a semifinished product or article comprising an elastomeric matrix in which at least one cord as defined above is embedded.

A further subject of the invention is the use of a cord as defined above for reinforcing a tyre comprising the cord.

Finally, another subject of the invention is a tyre comprising a filamentary reinforcing element obtained by embedding a cord as defined above in an elastomeric matrix. A tyre is understood to mean a casing intended to form a cavity by cooperating with a support element, for example a rim, this cavity being able to be pressurized to a pressure higher than atmospheric pressure. A tyre according to the invention has a structure of substantially toroidal shape.

Within the tyre according to the invention, the cord is embedded in the elastomeric matrix. Thus, within the tyre according to the invention, the cord comprises a filling material for the internal enclosure that is based on an elastomeric composition and is situated in the internal enclosure of the filled cord. The filling material is in this case based on the same elastomeric composition as that on which the elastomeric matrix in which the cord is embedded is based.

DETAILED DESCRIPTION

The values of the characteristics Df, Dv, Rf and of the other characteristics described above are measured on or determined from plies and cords extracted from a tyre. The characteristics of the cord that are described above ensure that, upon completion of the method for manufacturing the tyre, given the shaping step, the tyre will have the advantages described above.

An elastomeric matrix means a matrix with elastomeric behaviour resulting from the crosslinking of an elastomeric composition. The elastomeric matrix is thus based on the elastomeric composition. Just like the elastomeric matrix, the filling material is based on an elastomeric composition, in this case the same composition as that of the matrix in which the cord is embedded.

The expression "based on" should be understood as meaning that the composition comprises the compound and/or the product of the in situ reaction of the various constituents used, some of these constituents being able to react and/or being intended to react with one another, at least partially, during the various phases of manufacture of the composition; the composition thus being able to be in the fully or partially crosslinked state or in the non-crosslinked state.

An elastomeric composition means that the composition comprises at least one elastomer and at least one other component. Preferably, the composition comprising at least one elastomer and at least one other component comprises an elastomer, a crosslinking system and a filler. The compositions used for these plies are conventional compositions for the skim coating of filamentary reinforcing elements and comprise a diene elastomer, for example natural rubber, a reinforcing filler, for example carbon black and/or silica, a crosslinking system, for example a vulcanizing system, preferably comprising sulfur, stearic acid and zinc oxide, and optionally a vulcanization accelerant and/or retarder and/or various additives. The adhesion between the filamentary reinforcing elements and the matrix in which they are embedded is ensured for example by an ordinary adhesive composition, for example an adhesive of the RFL type or an equivalent adhesive.

The secant modulus in tension of a ply for a force equal to 15% of the force at break is denoted $MA_{15}$ and expressed in daN/mm. The modulus $MA_{15}$ is calculated on the basis of a force-elongation curve obtained by applying the standard ASTM D2969-04 of 2014 to a cord of the ply. The secant modulus in tension of the cord is calculated by determining the gradient of the straight line drawn between the points (0,0) and the point of the curve having an ordinate value equal to 15% of the force at break. The modulus $MA_{15}$ is determined by multiplying the secant modulus in tension of the cord by the density of cords per mm of ply. It will be recalled that the density d of filamentary reinforcing elements in a ply is the number of filamentary reinforcing elements present in the ply in a direction perpendicular to the direction in which the filamentary reinforcing elements extend in the ply. The density d can also be determined from the laying pitch p expressed in mm, the laying pitch being equal to the axis-to-axis distance between two consecutive filamentary reinforcing elements in the direction perpendicular to the direction in which the reinforcing elements extend in the ply. The relationship between d and p is $d=100/p$.

The force at break of a cord is measured according to the standard ASTM D2969-04 of 2014. The force at break of a ply is calculated on the basis of a force-elongation curve obtained by applying the standard ASTM D2969-04 of 2014 to a cord of the ply. The force at break of the ply is determined by multiplying the force at break of the cord by the density of cords per unit width of the ply, this density being as defined above.

The optional characteristics described below could be combined with one another in so far as such combinations are technically compatible.

The tyres of the invention may be intended for passenger motor vehicles (comprising in particular 4×4 vehicles and SUVs (Sport Utility Vehicles)), but also for two-wheel vehicles such as motorcycles, or for industrial vehicles chosen from vans, heavy-duty vehicles—i.e. light rail vehicles, buses, heavy road transport vehicles (lorries, tractors, trailers), off-road vehicles—, agricultural or construction plant vehicles, aircraft and other transport or handling vehicles. Very preferably, the tyres of the invention are intended for passenger vehicles.

Advantageously, the tyre comprises a crown comprising a tread and a crown reinforcement, two sidewalls, two beads, each sidewall connecting each bead to the crown, the crown reinforcement extending in the crown in a circumferential direction of the tyre, the tyre comprising a carcass reinforcement that is anchored in each of the beads and extends in the sidewalls and in the crown, the crown reinforcement being radially interposed between the carcass reinforcement and the tread, the crown reinforcement comprising a filamentary reinforcing element obtained by embedding a cord as defined above in an elastomeric matrix.

Preferably, the crown reinforcement comprises a hoop reinforcement comprising at least one hooping ply and preferably a single hooping ply. The hoop reinforcement is formed preferably by a hooping ply. This embodiment is particularly appropriate for a tyre for passenger vehicles, two-wheel vehicles, industrial vehicles chosen from vans, heavy-duty vehicles, for example light rail vehicles, buses, heavy road transport vehicles (lorries, tractors, trailers), and preferably for passenger vehicles.

Preferably, the crown reinforcement comprises a working reinforcement comprising at least one working ply.

In one embodiment, the hoop reinforcement is radially interposed between the working reinforcement and the tread. Thus, by virtue of the use of metal cords, the hoop reinforcement has, in addition to its hooping function, a function of protecting against punctures and impacts that is much more effective than a hoop reinforcement comprising textile hooping filamentary reinforcing elements.

Advantageously, the hooping ply comprises at least one filamentary reinforcing element obtained by embedding a cord as defined above in an elastomeric matrix.

By virtue of its reduced diameter, the cord makes it possible to reduce the thicknesses of the hooping ply, the weight of the latter, the hysteresis of the tyre, and therefore the rolling resistance of the tyre. Specifically, all other things being equal, the greater the thickness of the hooping ply, the greater the hysteresis thereof. By reducing the diameter, the total thickness of the ply is reduced, while the thickness present at the back of each cord is maintained, making it possible to maintain the decoupling thicknesses between the tread and the hooping ply, for the one part, and between the plies radially on the inside of the hooping ply and the hooping ply itself, for the other part. Moreover, by keeping the thickness at the back of each cord constant, the resistance to the passage of corrosive agents through the hooping ply is retained, making it possible for the working reinforcement to be protected, this protection being all the more important when the working reinforcement comprises only a single working ply.

In addition, by virtue of its excellent longitudinal compressibility, the cord makes it possible to give the tyre excellent endurance under compression, this being all the more advantageous in the case of the elimination of the working ply compared with a prior art tyre described in US2007006957. Moreover, compared with the hooping textile filamentary reinforcing elements of the prior art described in WO2016/166056, the hoop reinforcement is, on account of the use of metal filamentary elements, less expensive, more thermally stable and gives the tyre mechanical protection. In addition, the use of metal filamentary elements makes it easier to check the hoop reinforcement by radiography after it has been manufactured. Finally, compared with the prior art cord 3.26 described in WO2016/166056, the cord of the tyre according to the invention exhibits excellent longitudinal compression and therefore much better endurance under compression.

Finally, by virtue of the use of metal cords, the hoop reinforcement has, in addition to its hooping function, a function of protecting against punctures and impacts that is much more effective than a hoop reinforcement comprising hooping textile filamentary reinforcing elements.

Advantageously, the or each hooping filamentary reinforcing element makes an angle strictly less than 10°, preferably less than or equal to 7° and more preferably less than or equal to 5° with the circumferential direction of the tyre.

Advantageously, the or each working ply comprises a plurality of working filamentary reinforcing elements. Preferably, each working filamentary reinforcing element is a metal filamentary element.

Preferably, the working filamentary reinforcing elements of each ply are arranged side by side in a manner substantially parallel to one another. More preferably, each working filamentary reinforcing element extends axially from one axial end of the working reinforcement of the tyre to the other axial end of the working reinforcement of the tyre.

Preferably, the crown reinforcement comprises at least one carcass ply and more preferably a single carcass ply. The carcass reinforcement is preferably formed by a carcass ply. This embodiment is particularly appropriate for a tyre for passenger vehicles, two-wheel vehicles, industrial vehicles chosen from vans, heavy-duty vehicles, for example light rail vehicles, buses, heavy road transport vehicles (lorries, tractors, trailers), and preferably for passenger vehicles.

Advantageously, the carcass ply comprises carcass filamentary reinforcing elements.

Preferably, each carcass filamentary reinforcing element is a textile filamentary element. By definition, textile means a non-metal filamentary element formed by one or More elementary textile monofilaments optionally coated with one or more layers of a coating based on an adhesive composition. Each elementary textile monofilament is obtained, for example, by melt spinning, solution spinning or gel spinning. Each elementary textile monofilament is made from an organic material, in particular a polymeric material, or an inorganic material, for example glass or carbon. The polymeric materials may be of the thermoplastic type, for example aliphatic polyamides, in particular polyamides 6,6, and polyesters, in particular polyethylene terephthalate. The polymeric materials may be of the non-thermoplastic type, for example aromatic polyamides, in particular aramid, and cellulose, either natural or artificial, in particular rayon.

Preferably, each carcass filamentary reinforcing element extends axially from one bead of the tyre to the other bead of the tyre.

Advantageously, at least the working filamentary reinforcing elements and the carcass filamentary reinforcing elements are arranged so as to define a triangle mesh in projection onto an equatorial circumferential plane in the radial direction of the tyre.

In an advantageous embodiment, the crown reinforcement is formed by the working reinforcement and the hoop reinforcement.

A ply means the assembly, for the one part, of one or more filamentary reinforcing elements and, for the other part, an elastomeric matrix, the filamentary reinforcing element(s) being embedded in the elastomeric matrix.

Advantageously, the filamentary reinforcing elements of each ply are embedded in an elastomeric matrix. The different plies may comprise the same elastomeric matrix or different elastomeric matrices.

In a first embodiment of the tyre according to the invention, the working reinforcement comprises two working plies and preferably the working reinforcement is made up of two working plies.

In this first embodiment, the working filamentary reinforcing elements and the carcass filamentary reinforcing elements are arranged so as to define a triangle mesh in projection onto an equatorial circumferential plane in the radial direction of the tyre. In this first embodiment, the hooping filamentary reinforcing elements are not necessary for defining the triangle mesh.

Advantageously, in this first embodiment, each working filamentary reinforcing element in each working ply forms an angle ranging from 10° to 40°, preferably ranging from 20° to 30°, with the circumferential direction of the tyre.

Advantageously, the orientation of the angle made by the working filamentary reinforcing elements with the circumferential direction of the tyre in one working ply is opposite to the orientation of the angle made by the working filamentary reinforcing elements with the circumferential direction of the tyre in the other working ply. In other words, the working filamentary reinforcing elements in one working ply are crossed with the working filamentary reinforcing elements in the other working ply.

Advantageously, each carcass filamentary reinforcing element makes an angle greater than or equal to 80°, preferably ranging from 80° to 90°, with the circumferential direction of the tyre in the median plane of the tyre, in other words in the crown of the tyre.

Advantageously, each carcass filamentary reinforcing element makes an angle greater than or equal to 80°, preferably ranging from 80° to 90°, with the circumferential direction of the tyre in the equatorial circumferential plane of the tyre, in other words in each sidewall.

In a second embodiment of the invention, the working reinforcement comprises a single working ply. The working reinforcement is preferably formed by a working ply. This embodiment is particularly advantageous when the or each hooping filamentary reinforcing element is formed by a cord as defined above. The mechanical strength and endurance properties of the hoop reinforcement that are described above then make it possible to eliminate a working ply from the working reinforcement. A significantly lighter tyre is obtained.

In this second embodiment, the hooping filamentary reinforcing element(s), the working filamentary reinforcing elements and the carcass filamentary reinforcing elements are arranged so as to define a triangle mesh in projection onto an equatorial circumferential plane in the radial direction of the tyre. In this second embodiment, unlike the first embodiment, the hooping filamentary reinforcing elements are necessary for defining the triangle mesh.

Advantageously, each carcass reinforcing filamentary element makes an angle $A_{C1}$ greater than or equal to 55°, preferably ranging from 55° to 80° and more preferably ranging from 60° to 70°, with the circumferential direction of the tyre in the median plane of the tyre, in other words in the crown of the tyre. Thus, the carcass filamentary reinforcing elements, on account of the angle formed with the circumferential direction, are involved in the formation of the triangle mesh in the crown of the tyre.

In one embodiment, each carcass filamentary reinforcing element makes an angle $A_{C2}$ greater than or equal to 85° with the circumferential direction of the tyre in the equatorial circumferential plane of the tyre, in other words in each sidewall of the tyre. The carcass filamentary reinforcing elements are substantially radial in each sidewall, that is to say substantially perpendicular to the circumferential direction, making it possible for all the advantages of a radial tyre to be retained.

In one embodiment, each working filamentary reinforcing element makes an angle $A_T$ greater than or equal to 10°, preferably ranging from 30° to 50° and more preferably from 35° to 45°, with the circumferential direction of the tyre in the median plane of the tyre. Thus, the working filamentary reinforcing elements, on account of the angle formed with the circumferential direction, are involved in the formation of the triangle mesh in the crown of the tyre.

In order to form a triangular mesh that is as effective as possible, the orientation of the angle $A_T$ and the orientation of the angle $A_{C1}$ are preferably opposite with respect to the circumferential direction of the tyre.

Whether in the first or the second embodiment described above, advantageously, the hooping ply advantageously has a secant modulus in tension greater than or equal to 300 daN·mm$^{-1}$, preferably greater than or equal to 350 daN·mm$^{-1}$ and more preferably greater than or equal to 400 daN·mm$^{-1}$ for a force equal to 15% of the force at break of the hooping ply. In one embodiment, the hooping ply advantageously has a secant modulus in tension lower than or equal to 500 daN/mm$^{-1}$, preferably lower than or equal to 450 daN·mm$^{-1}$ for a force equal to 15% of the force at break of the hooping ply.

Whether in the first or the second embodiment described above, advantageously, the force at break of the hooping ply is greater than or equal to 55 daN·mm$^{-1}$, preferably greater than or equal to 60 daN·mm$^{-1}$ and more preferably greater than or equal to 65 daN·mm$^{-1}$. Advantageously, the force at break of the hooping ply is lower than or equal to 85 daN·mm$^{-1}$, preferably lower than or equal to 80 daN·mm$^{-1}$ and more preferably lower than or equal to 75 daN·mm$^{-1}$.

Method for Manufacturing the Tyre According to the Invention

The tyre according to the invention is manufactured using the method described below.

First of all, each carcass ply, each working ply and each hooping ply is manufactured Each ply is manufactured by embedding the filamentary reinforcing elements of each ply in a non-crosslinked elastomeric composition.

Then, the carcass reinforcement, the working reinforcement, the hoop reinforcement and the tread are arranged so as to form a green form of tyre.

Next, the green form of tyre is shaped so as to at least radially enlarge the green form of tyre. This step has the effect of circumferentially lengthening each ply of the green form of tyre. This step has the effect of lengthening the or each hooping filamentary reinforcing element in the circumferential direction of the tyre. Thus, the or each hooping filamentary reinforcing element has, before the shaping step, characteristics that are different from those after the shaping step.

As described above, the characteristics of the cord without filling material that are described above ensure that, upon completion of the method for manufacturing the tyre, given the shaping step, the tyre will have the advantages described above.

Finally, the compositions of the shaped green form of tyre are crosslinked, for example by curing or vulcanization, so as to obtain the tyre in which each composition exhibits a crosslinked state and forms an elastomeric matrix based on the composition.

BRIEF DESCRIPTION OF THE DRAWINGS

The invention will be understood better on reading the following description, which is given purely by way of non-limiting example and with reference to the drawings, in which.

TYRE ACCORDING TO A FIRST EMBODIMENT OF THE INVENTION

Figure 1:
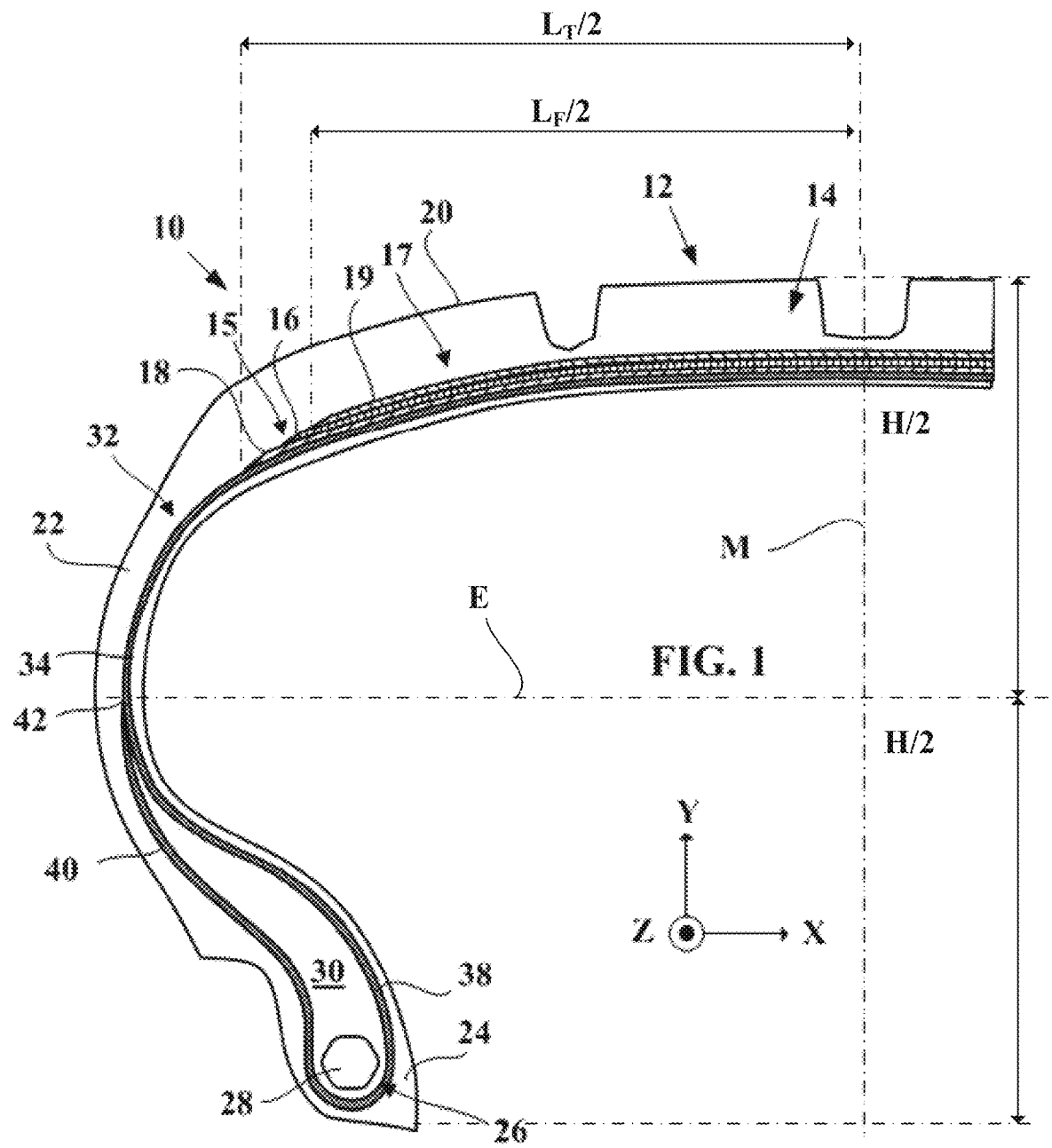
FIG. 1 is a view in radial section of a tyre according to a first embodiment of the invention.

FIG. 1 shows a reference frame X, Y, Z corresponding to the usual axial (X), radial (Y) and circumferential (Z) directions, respectively, of a tyre.

FIG. 1 schematically shows a view in radial section of a tyre according to the invention denoted by the general reference 10. The tyre 10 substantially exhibits revolution about an axis substantially parallel to the axial direction X. The tyre 10 is in this case intended for a passenger vehicle.

The tyre 10 has a crown 12 comprising a crown reinforcement 14 comprising a working reinforcement 15 comprising two working plies 16, 18 comprising working filamentary reinforcing elements 46, 47, respectively, and a hoop reinforcement 17 comprising a hooping ply 19 comprising at least one hooping filamentary reinforcing element 48. The crown reinforcement 14 extends in the crown 12 in the circumferential direction Z of the tyre 10. The crown 12 comprises a tread 20 arranged radially on the outside of the crown reinforcement 14. In this case, the hoop reinforcement 17, in this case the hooping ply 19, is radially interposed between the working reinforcement 15 and the tread 20. In this case, the working reinforcement 15 comprises only two working plies 16, 18 and the hoop reinforcement 17 comprising a single hooping ply 19. In this case, the working reinforcement 15 is made up of the two working plies 16, 18 and the hoop reinforcement 17 is made up of the hooping ply 19. The crown reinforcement 14 is made up of the working reinforcement 15 and the hoop reinforcement 17.

The tyre 10 also comprises two sidewalls 22 extending the crown 12 radially towards the inside. The tyre 10 also has two beads 24 radially on the inside of the sidewalls 22, each having an annular reinforcing structure 26, in this case a bead wire 28, surmounted by a mass of filling rubber 30 on the bead wire, and also a radial carcass reinforcement 32. Each sidewall 22 connects each bead 24 to the crown 12.

The carcass reinforcement 32 has a carcass ply 34 comprising a plurality of carcass filamentary reinforcing elements 44, the carcass ply 34 being anchored to each of the beads 24 by a turnup around the bead wire 28 so as to form, in each bead 24, a main strand 38 extending from the beads through the sidewalls towards the crown 12, and a turnup strand 40, the radially outer end 42 of the turnup strand 40 being radially on the outside of the annular reinforcing structure 26. The carcass reinforcement 32 thus extends from the beads 24 in and through the sidewalls 22, and into the crown 12. The carcass reinforcement 32 is arranged radially on the inside of the crown reinforcement 14 and the hoop reinforcement 17. The crown reinforcement 14 is therefore radially interposed between the carcass reinforcement 32 and the tread 20. The carcass reinforcement 32 comprises a single carcass ply 34. In this case, the carcass reinforcement 32 is formed by the carcass ply 34.

The tyre 10 also comprises an airtight internal layer 46, preferably made of butyl, that is situated axially on the inside of the sidewalls 22 and radially on the inside of the crown reinforcement 14 and extends between the two beads 24.

Each working ply 16, 18, hooping ply 19 and carcass ply 34 comprises an elastomeric matrix in which reinforcing elements of the corresponding ply are embedded. Each elastomeric matrix of the working plies 16, 18, hooping ply 19 and carcass ply 34 is based on a conventional elastomeric composition for the skim coating of reinforcing elements conventionally comprising a diene elastomer, for example natural rubber, a reinforcing filler, for example carbon black and/or silica, a crosslinking system, for example a vulcanizing system, preferably comprising sulfur, stearic acid and zinc oxide, and possibly a vulcanization accelerator and/or retarder and/or various additives.

Figure 2:
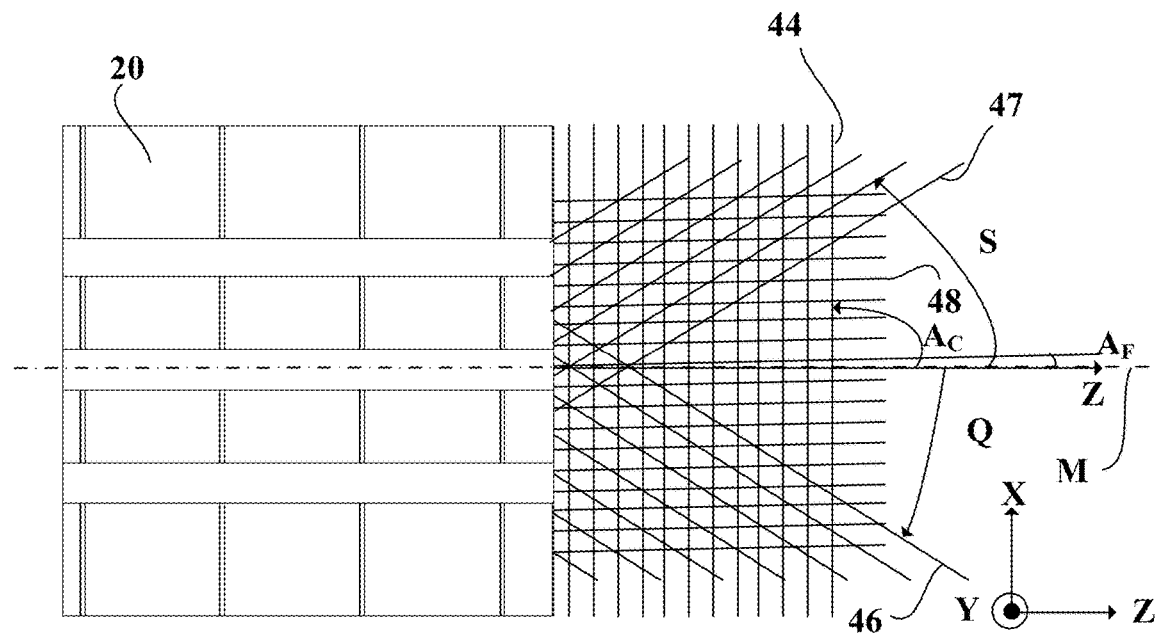
FIG. 2 is a cutaway view of the tyre in FIG. 1 illustrating the projection onto the equatorial circumferential plane E of the hooping filamentary reinforcing elements, of the working filamentary reinforcing elements and of the carcass filamentary reinforcing elements.
Figure 3:
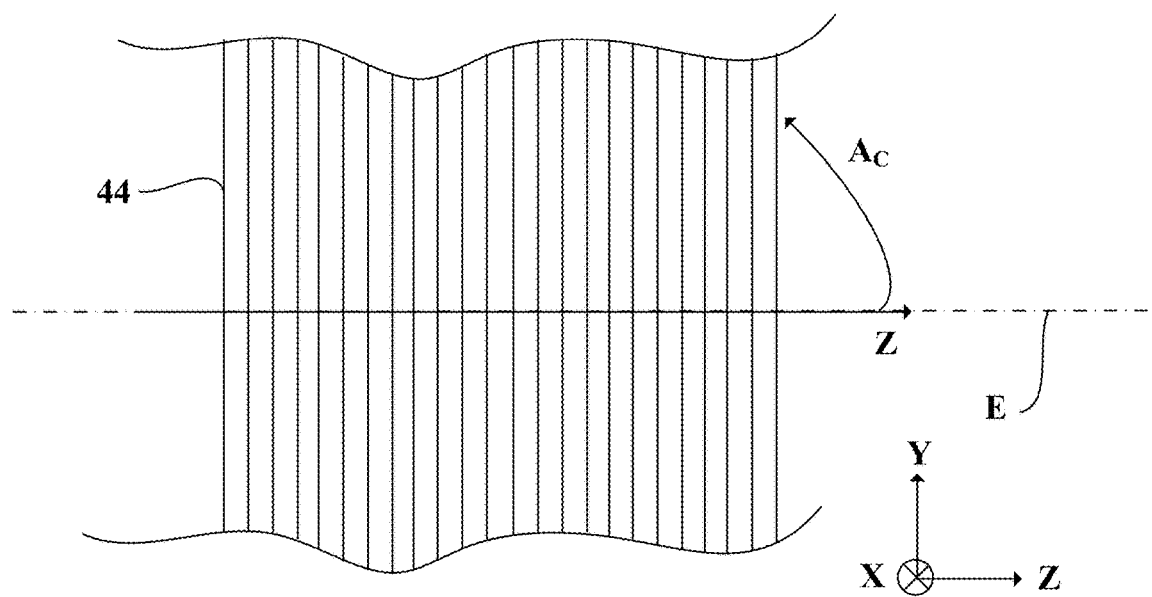
FIG. 3 is a view of the carcass filamentary reinforcing elements arranged in the sidewall of the tyre in FIG. 1 in projection onto the median plane M of the tyre.

With reference to FIGS. 2 and 3, each carcass filamentary reinforcing element 44 extends axially from one bead 24 of the tyre 10 to the other bead 24 of the tyre 10. Each carcass filamentary reinforcing element 44 makes an angle $A_C$ greater than or equal to 80°, preferably ranging from 80° to 90°, with the circumferential direction Z of the tyre 10 in the median plane M and equatorial circumferential plane E of the tyre 10, in other words in the crown 12 and in each sidewall 22.

With reference to FIG. 2, the working filamentary reinforcing elements 46, 47 of each working ply 16, 18 are arranged side by side in a manner substantially parallel to one another. Each working filamentary reinforcing element 46, 47 extends axially from one axial end of the working reinforcement 15 of the tyre 10 to the other axial end of the working reinforcement 15 of the tyre 10. Each working filamentary reinforcing element 46, 48 makes an angle ranging from 10° to 40°, preferably ranging from 20° to 30° and in this case equal to 26° with the circumferential direction Z of the tyre 10 in the median plane M. The orientation of the angle S made by the working filamentary reinforcing elements 46 with the circumferential direction Z of the tyre 10 in the working ply 16 is opposite to the orientation of the angle Q made by the working filamentary reinforcing elements 47 with the circumferential direction Z of the tyre 10 in the other working ply 18. In other words, the working filamentary reinforcing elements 46 in one working ply 16 are crossed with the working filamentary reinforcing elements 47 in the other working ply 18.

Figure 4:
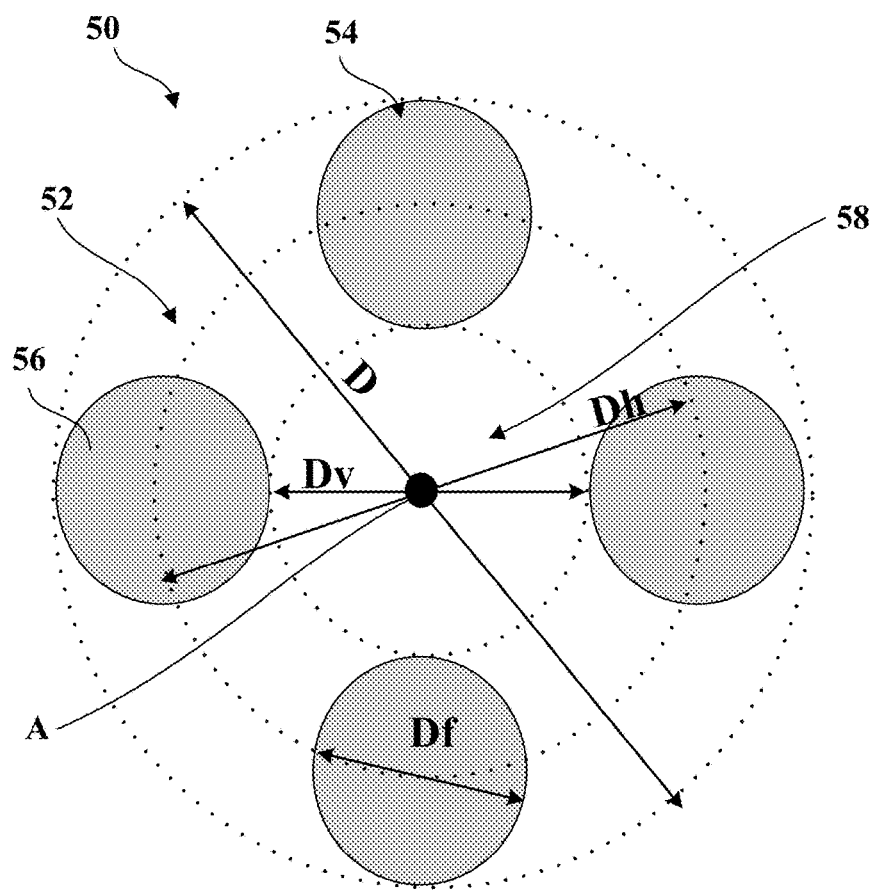
FIG. 4 is a view in cross section perpendicular to its axis of a cord according to a first embodiment of the invention (assumed to be rectilinear and at rest)
Figure 5:
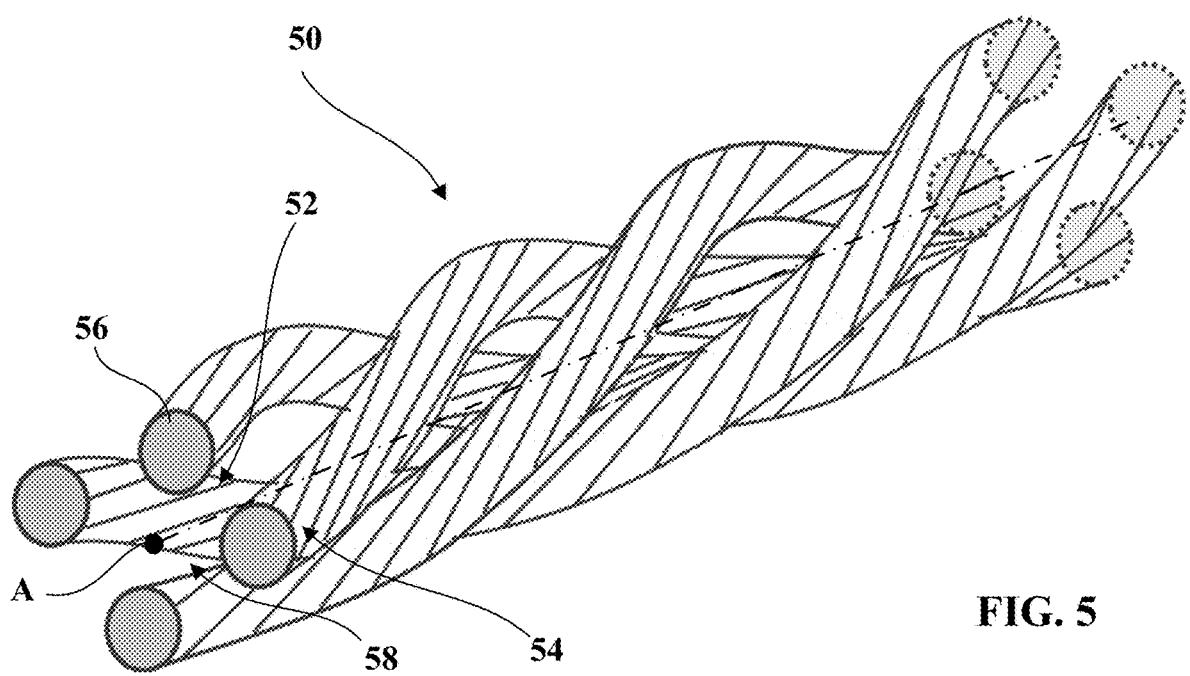
FIG. 5 is a perspective view of the cord in FIG. 4.

With reference to FIG. 2, the single hooping ply 19 comprises at least the hooping filamentary reinforcing element 48 obtained by embedding the cord 50 in an elastomeric matrix based on the elastomeric composition of the hooping ply 19 and as illustrated in FIGS. 4 and 5 and described in more detail below. Being embedded in the matrix of the hooping ply 19, the cord 50 within the tyre 10 comprises a filling material for the internal enclosure 58 based on the elastomeric composition of the hooping ply 19, this filling material 53 being situated in the internal enclosure 58 of the cord 50. In this instance, the hooping ply 19 comprises a single hooping filamentary reinforcing element 48 wound continuously over an axial width $L_F$ of the crown 12 of the tyre 10. Advantageously, the axial width $L_F$ is less than the width $L_T$ of the working ply 18. The hooping filamentary reinforcing element 48 makes an angle $A_F$ strictly less than 10° with the circumferential direction Z of the tyre 10, preferably less than or equal to 7°, and more preferably less than or equal to 5°. In this instance, the angle is in this case equal to 5°.

The carcass filamentary reinforcing elements 44 and working filamentary reinforcing elements 46, 47 are arranged, in the crown 12, so as to define a triangle mesh in projection onto the equatorial circumferential plane E in the radial direction of the tyre.

Each carcass filamentary reinforcing element 44 is a textile filamentary element and conventionally comprises two multifilament strands, each multifilament strand being made up of a spun yarn of polyester, in this case PET, monofilaments, these two multifilament strands being individually overtwisted at 240 turns·m$^{-1}$ in one direction and then twisted together at 240 turns·m$^{-1}$ in the opposite direction. These two multifilament strands are wound in a helix around one another. Each of these multifilament strands has a count equal to 220 tex.

Each working filamentary reinforcing element 46, 47 is a metal filamentary element and in this case is an assembly of two steel monofilaments that each have a diameter equal to 0.30 mm, the two steel monofilaments being wound together at a pitch of 14 mm.

CORD ACCORDING TO A FIRST EMBODIMENT OF THE INVENTION

With reference to FIGS. 4 and 5, the cord 50 according to the invention comprises a single layer 52 of helically wound metal filamentary elements 54. In this instance, the cord 50 is made up of the single layer 52, in other words the cord 50 does not comprise any other metal filamentary element than those of the layer 52. The layer 52 is made up of N helically wound metal filamentary elements, N ranging from 3 to 6 and in this case N=4. The cord 50 has a main axis A extending substantially parallel to the direction in which the cord extends along its greatest length. Each metal filamentary element 54 of the layer 52 describes, when the cord 50 extends in a substantially rectilinear direction, a helical path about the main axis A substantially parallel to the substantially rectilinear direction, such that, in a section plane substantially perpendicular to the main axis A, the distance between the centre of each metal filamentary element 54 of the layer 52 and the main axis A is substantially constant and identical for all the metal filamentary elements 54 of the layer 52. This constant distance between the centre of each metal filamentary element 54 of the layer 52 and the main axis A is equal to half the helix diameter Dh.

In the embodiment illustrated, each metal filamentary element 54 comprises a single metal monofilament 56. Each metal filamentary element 54 also comprises a layer (not shown) of a metal coating comprising copper, zinc, tin, cobalt or an alloy of these metals, in this case brass. Each metal monofilament 56 is made of carbon steel and has a tensile strength in this case equal to 3100 MPa.

The diameter Df of each metal filamentary element 54 is such that 0.10≤Df≤0.50 mm, preferably 0.20 mm≤Df≤0.35 mm and more preferably 0.25 mm≤Df≤0.33 mm, and in this case Df=0.32 mm for all the metal filamentary elements 54. Each metal filamentary element 54 is without preforming marks.

The cord 50 has a diameter D such that D≤2.00 mm, preferably 0.75 mm≤D≤1.40 mm and more preferably 1.00 mm≤D≤1.30 mm, and in this case D=1.27 mm.

Advantageously, each metal filamentary element 54 is wound at a pitch P such that 3 mm≤P≤15 mm, preferably 3 mm≤P≤9 mm, and in this case P=8 mm.

The ratio K of the pitch P to the diameter Df of each metal filamentary element, P and Df being expressed in millimetres, is such that 19≤K≤44, and in this case K=25.

Figure 6:
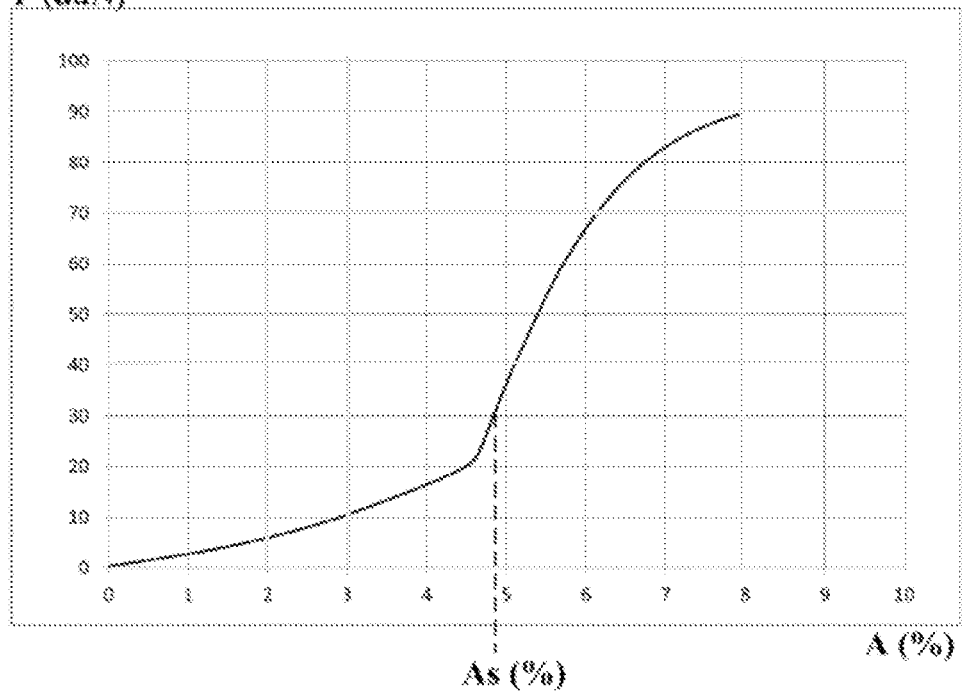
FIG. 6 illustrates a force-elongation curve of the cord in FIGS. 4 and 5.
Figure 7:
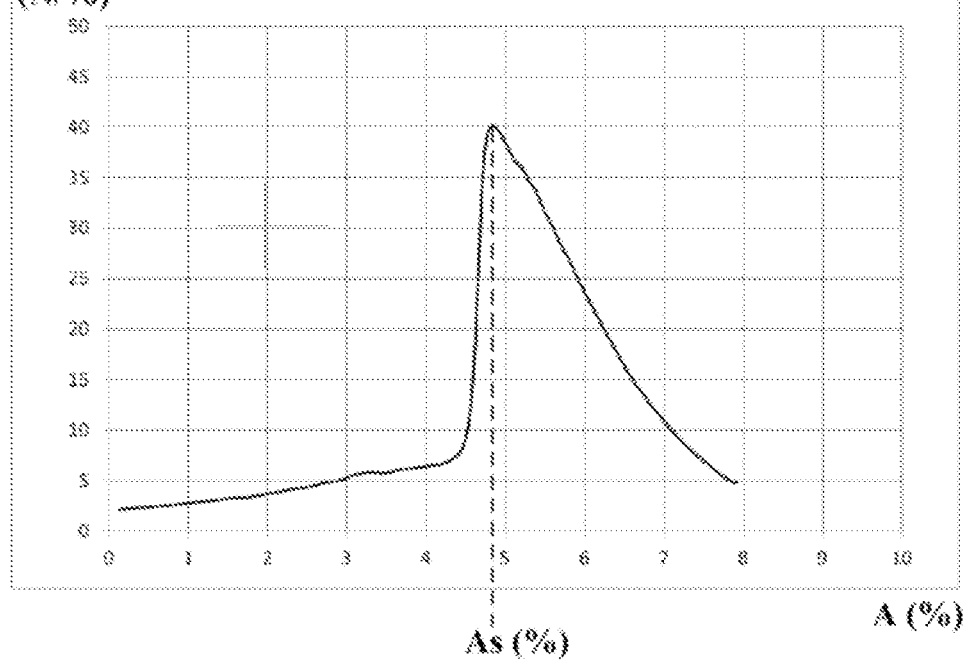
FIG. 7 illustrates a curve showing the variation in the derivative of the curve in FIG. 6 as a function of the elongation.

The cord 50 according to the first embodiment has a structural elongation As such that As≥1%, preferably such that As≥1%, preferably such that As≥2.5%, more preferably As≥3% and even more preferably 3%≤As≤5.5% and in this case equal to 4.8%. As described above, the value As is determined by plotting a force-elongation curve of the cord, applying the standard ASTM D2969-04 of 2014. The curve obtained is shown in FIG. 6. Then, the variation in the derivative of this force-elongation curve is deduced from this force-elongation curve. FIG. 7 shows the variation in this derivative as a function of elongation. The highest point of the derivative then corresponds to the value As.

The helix angle α of each metal filamentary element is such that 13°≤α≤21°. In this instance, as described above, with the characteristics of the cord 50, α(1)=20.05°, α(2)=20.36° and α(3)=α=20.37°.

Each metal filamentary element 54 has a helix radius of curvature Rf such that 2 mm≤Rf≤7 mm, preferably 2 mm≤Rf≤5 mm and more preferably 3 mm≤Rf≤5 mm. The radius of curvature Rf is calculated using the relationship Rf=P/(π×Sin(2α)). Since in this case P=8 mm and α=20.37°, Rf=3.90 mm.

The helix diameter Dh of each metal filamentary element is such that 0.40 mm≤Dh≤1.50 mm, preferably 0.50 mm≤Dh≤1.00 mm and more preferably 0.70 mm≤Dh≤1.00 mm. The helix diameter Dh is calculated using the relationship Dh=P×Tan(α)/π. Since in this case P=8 mm and α=20.37°, Dh=0.95 mm.

The metal filamentary elements 54 define an internal enclosure 58 of the cord 50 of diameter Dv. The enclosure diameter Dv is calculated using the relationship Dv=Dh−Df, in which Df is the diameter of each metal filamentary element and Dh is the helix diameter. Advantageously, Dv is such that Dv≥0.46 mm and preferably 0.46 mm≤Dv≤0.70 mm. In this case, since Dh=0.95 mm and Df=0.32 mm, Dv=0.63 mm.

According to the invention, 9≤Rf/Df≤30, and preferably 11≤Rf/Df≤19. In this case, Rf/Df=12.2. Likewise, according to the invention, 1.30≤Dv/Df≤2.1, preferably 1.30≤Dv/Df≤2.05 and more preferably 1.30≤Dv/Df≤2.00, and in this case Dv/Df=1.97.

CORD ACCORDING TO A SECOND EMBODIMENT OF THE INVENTION

Figure 8:
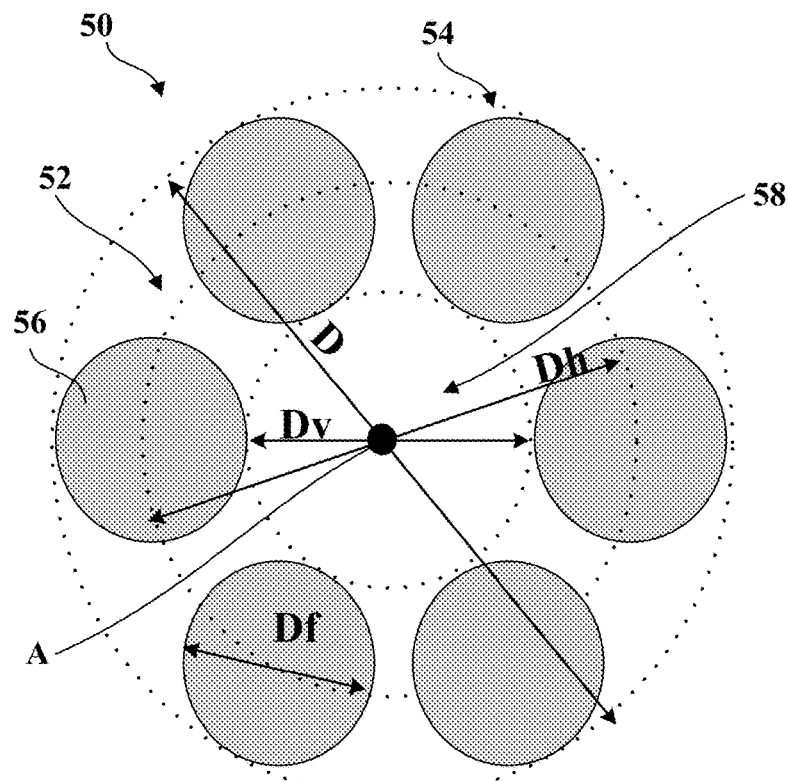
FIGS. 8 and 9 are figures similar to FIGS. 4 and 5 of a cord according to a second embodiment.
Figure 9:
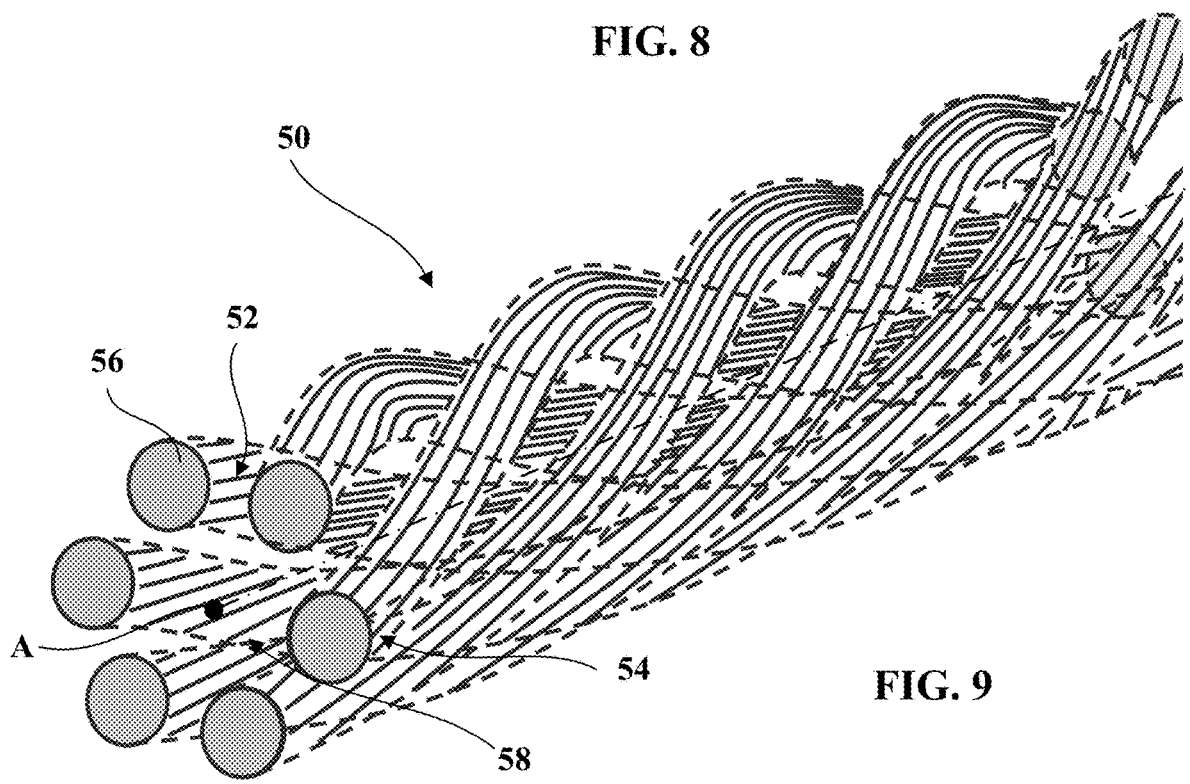

A second embodiment of a cord of the tyre according to the invention will now be described. This cord, denoted by the reference 50', is illustrated in FIGS. 8 and 9. Elements similar to those of the first embodiment that are shown in the previous figures are denoted by identical references.

The cord 50' comprises a single layer 52 of helically wound metal filamentary elements 54. The layer 52 is made up of N=6 helically wound metal filamentary elements.

In the embodiment illustrated, each metal filamentary element 54 comprises a single metal monofilament 56. Each metal filamentary element 54 also comprises a layer (not shown) of a metal coating comprising copper, zinc, tin, cobalt or an alloy of these metals, in this case brass.

The diameter Df of each metal filamentary element 54 is such that 0.10≤Df≤0.50 mm, preferably 0.20 mm≤Df≤0.35 mm and more preferably 0.25 mm≤Df≤0.33 mm, and in this case Df=0.32 mm for all the metal filamentary elements 54. Each metal filamentary element 54 is without preforming marks.

The cord 50' has a diameter D such that D≤2.00 mm, preferably 0.75 mm≤D≤1.30 mm and more preferably 1.00 mm≤D≤1.20 mm, and in this case D=1.15 mm.

Advantageously, each metal filamentary element 54 is wound at a pitch P such that 3 mm≤P≤15 mm, preferably 3 mm≤P≤9 mm, and in this case P=8 mm.

The ratio K of the pitch P to the diameter Df of each metal filamentary element, P and Df being expressed in millimetres, is such that 19≤K≤44, and in this case K=25.

On account of the high number of metal filamentary elements in the cord 50' and of its relatively small diameter, the cord 50' has a relatively moderate structural elongation As, in this case equal to 1.6%.

The helix angle α of each metal filamentary element is such that 13°≤α≤21°. In this instance, as described above, with the characteristics of the cord 50', α(1)=17.35°, α(2)=17.87° and α(3)=α=17.9°.

Each metal filamentary element 54 has a helix radius of curvature Rf such that 2 mm≤Cf≤7 mm, preferably 2 mm≤Rf≤5 mm and more preferably 3 mm≤Rf≤5 mm. The radius of curvature Rf is calculated using the relationship Rf=P/(π×Sin(2α)). Since in this case P=8 mm and α=17.9°, Rf=4.36 mm.

The helix diameter Dh of each metal filamentary element is such that 0.40 mm≤Dh≤1.50 mm, preferably 0.50 mm≤Dh≤0.90 mm and more preferably 0.70 mm≤Dh≤0.90 mm. The helix diameter Dh is calculated as in the first embodiment, and since in this case P=8 mm and α=17.9°, Dh=0.82 mm.

The enclosure diameter Dv is calculated as in the first embodiment. Advantageously, Dv is such that Dv≥0.46 mm and preferably 0.46 mm≤Dv≤0.60 mm. In this case, since Dh=0.82 mm and Df=0.32 mm, Dv=0.50 mm.

According to the invention, 9≤Rf/Df≤30, and preferably 11≤Rf/Df≤19. In this case, Rf/Df=13.6. Likewise, according to the invention, 1.30≤Dv/Df≤2.1, preferably 1.30≤Dv/Df≤2.05 and more preferably 1.30≤Dv/Df≤2.00, and in this case Dv/Df=1.56.

METHOD FOR MANUFACTURING THE TYRE ACCORDING TO THE FIRST EMBODIMENT

The tyre 10 is manufactured using the method described below.

First of all, the working ply 18 and the carcass ply 34 are manufactured by arranging the filamentary reinforcing elements of each ply parallel to one another and embedding them, for example by skim coating, in an uncrosslinked composition comprising at least an elastomer, the composition being intended to form an elastomeric matrix once crosslinked. A ply known as a straight ply, in which the filamentary reinforcing elements of the ply are parallel to one another and are parallel to the main direction of the ply, is obtained. Then, if necessary, portions of each straight ply are cut at a cutting angle and these portions are butted against one another so as to obtain a ply known as an angled ply, in which the filamentary reinforcing elements of the ply are parallel to one another and form an angle with the main direction of the ply equal to the cutting angle.

Then, an assembly method is implemented, during which the hoop reinforcement 17, in this case the hooping ply 19, is arranged radially on the outside of the working reinforcement 15. In this instance, in a first variant, a strip with a width B significantly less than $L_F$ is manufactured, in which the hooping filamentary reinforcing element 48 formed by a cord 50 is embedded in the elastomeric matrix based on the uncrosslinked elastomeric composition of the strip, and the strip is wound helically through several turns so to obtain the axial width $L_F$. In a second variant, the hooping ply 19 having a width $L_F$ is manufactured in a similar manner to the carcass and working plies and the hooping ply 19 is wound through one turn over the working reinforcement 15. In a third variant, the hooping filamentary reinforcing element 48 formed by the cord 50 is wound radially on the outside of the working ply 18, and then a layer based on the uncrosslinked elastomeric composition of the hooping ply 19, in which the hooping filamentary reinforcing element 48 formed by the cord 50 will be embedded during the curing of the tyre, is deposited on top. In the three variants, the bonded filamentary reinforcing element 48 formed by the cord 50 is embedded in a composition in order to form, at the end of the method for manufacturing the tyre, the hooping ply 19 comprising the hooping filamentary reinforcing element 48 formed by the cord 50.

Then, the carcass reinforcement, the working reinforcement, the hoop reinforcement and the tread are arranged so as to form a green form of tyre in which the compositions of the elastomeric matrices have not yet been crosslinked and are in an uncured state.

Next, the green form of tyre is shaped so as to at least radially enlarge the green form of tyre. Finally, the compositions of the shaped green form of tyre are crosslinked, for example by curing or vulcanization, so as to obtain the tyre in which each composition exhibits a crosslinked state and forms an elastomeric matrix based on the composition.

TYRE ACCORDING TO A SECOND EMBODIMENT OF THE INVENTION

Figure 10:
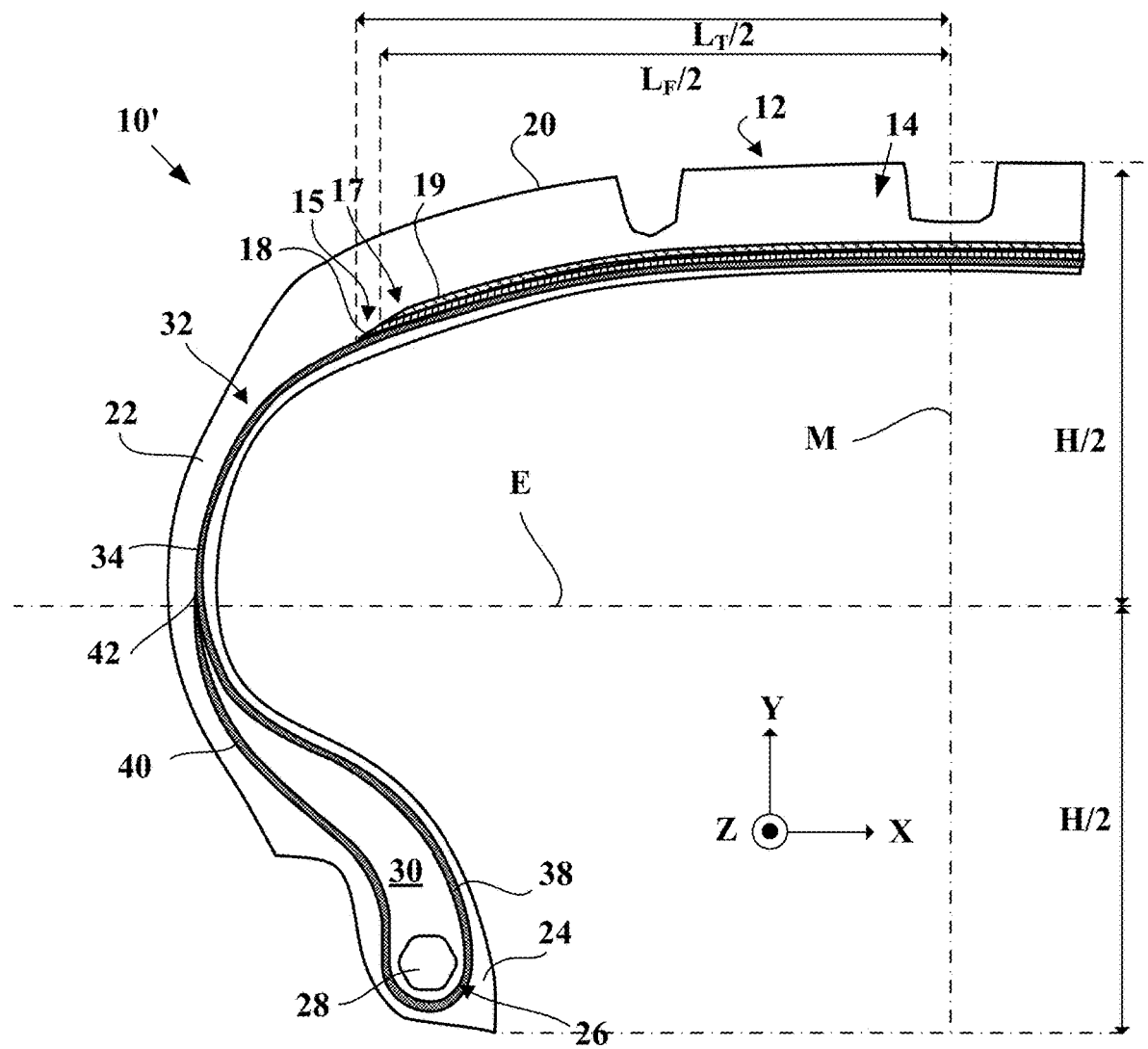
FIG. 10 is a view similar to the one in FIG. 1 of a tyre according to a second embodiment of the invention.
Figure 11:
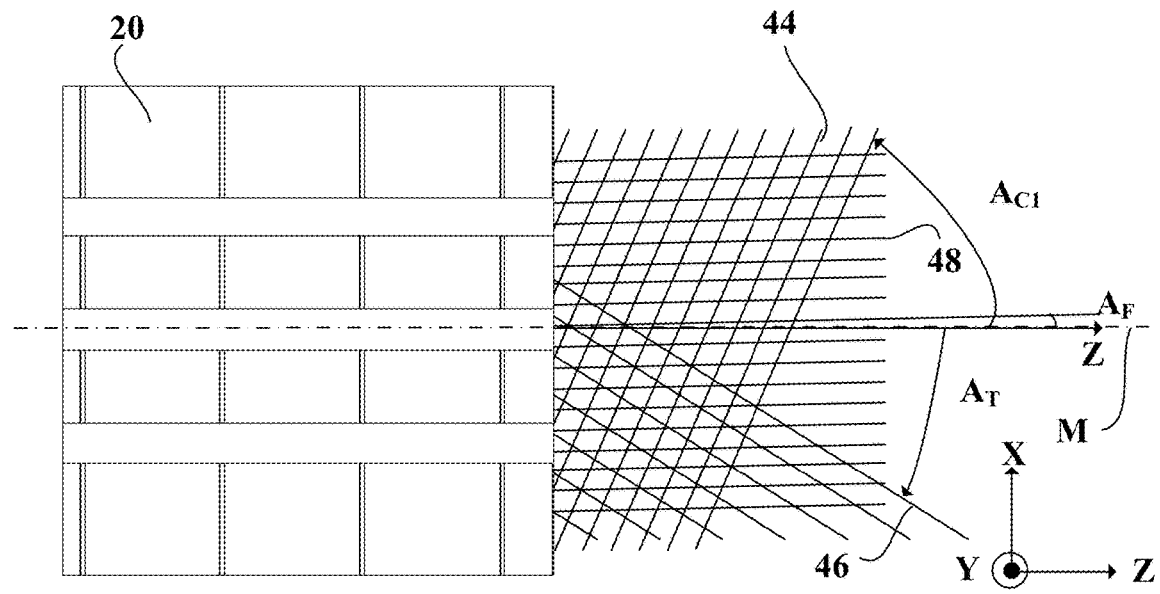
FIGS. 11 and 12 are views similar to those in FIGS. 2 and 3 of the tyre in FIG. 10 according to the second embodiment of the invention.
Figure 12:
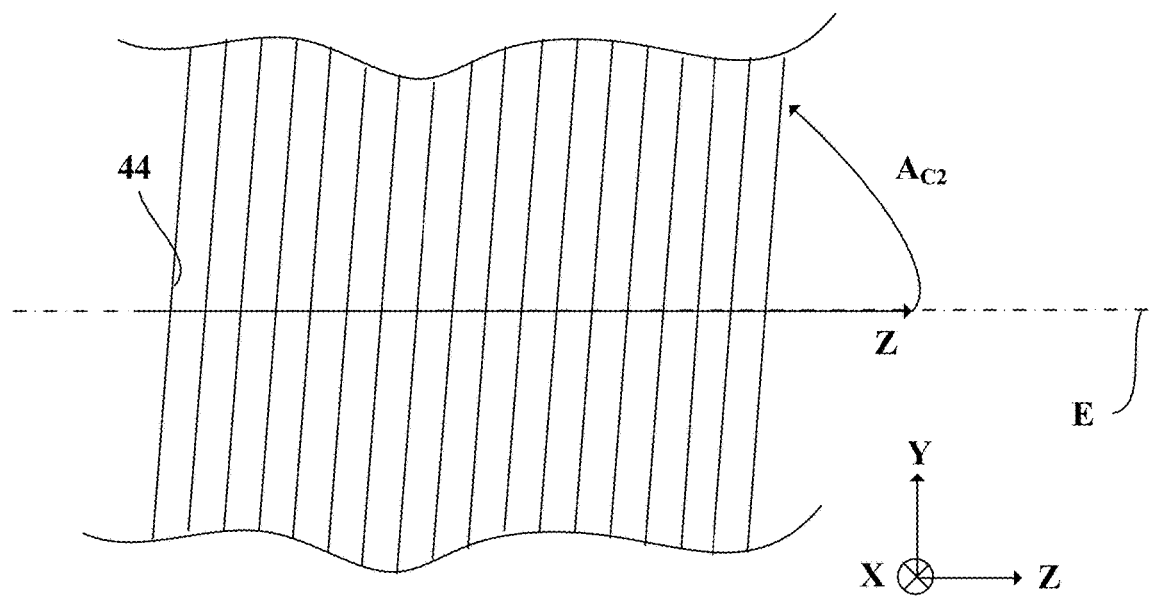

FIGS. 10 to 12 show a tyre 10' according to a second embodiment of the invention. In these figures, elements similar to those of the tyre 10 according to the first embodiment are denoted by identical references.

The tyre 10' substantially exhibits revolution about an axis substantially parallel to the axial direction X. The tyre 10' is in this case intended for a passenger vehicle.

The tyre 10' has a crown 12 comprising a tread 20 and a crown reinforcement 14 extending in the crown 12 in the circumferential direction Z.

The crown reinforcement 14 comprises a working reinforcement 15 comprising a single working ply 18 and a hoop reinforcement 17 comprising a single hooping ply 19. In this case, the working reinforcement 15 is made up of the working ply 18 and the hoop reinforcement 17 is made up of the hooping ply 19. The crown reinforcement 14 is made up of the working reinforcement 15 and the hoop reinforcement 17.

The crown reinforcement 14 is surmounted by the tread 20. In this case, the hoop reinforcement 17, in this case the hooping ply 19, is radially interposed between the working reinforcement 15 and the tread 20.

The tyre 10' comprises two sidewalls 22 extending the crown 12 radially towards the inside. The tyre 10' also has two beads 24 that are radially on the inside of the sidewalls 22 and each have an annular reinforcing structure 26, in this instance a bead wire 28, surmounted by a mass of filling rubber 30, and also a radial carcass reinforcement 32. The crown reinforcement 14 is situated radially between the carcass reinforcement 32 and the tread 20. Each sidewall 22 connects each bead 24 to the crown 12.

The carcass reinforcement 32 has a single carcass ply 34. In this case, the carcass reinforcement 32 is formed by the carcass ply 34. The carcass reinforcement 32 is anchored in each of the beads 24 by being turned up around the bead wire 28 so as to form, within each bead 24, a main strand 38 extending from the beads 24 through the sidewalls 22 and into the crown 12, and a turnup strand 40, the radially outer end 42 of the turnup strand 40 being radially on the outside of the annular reinforcing structure 26. The carcass reinforcement 32 thus extends from the beads 24 through the sidewalls 22 and into the crown 12. In this embodiment, the carcass reinforcement 32 also extends axially through the crown 12. The crown reinforcement 14 is radially interposed between the carcass reinforcement 32 and the tread 20.

Each working ply 18, hooping ply 19 and carcass ply 34 comprises an elastomeric matrix in which one or more reinforcing elements of the corresponding ply are embedded.

With reference to FIG. 11, the single carcass ply 34 comprises carcass filamentary reinforcing elements 44. Each carcass filamentary reinforcing element 44 extends axially from one bead 24 of the tyre 10 to the other bead 24 of the tyre 10. Each carcass filamentary reinforcing element 44 makes an angle $A_{C1}$ greater than or equal to 55°, preferably ranging from 55° to 80° and more preferably from 60° to 70°, with the circumferential direction Z of the tyre 10 in the median plane M of the tyre 10', in other words in the crown 12. With reference to FIG. 12, which is a simplified view in which, given the scale, all the carcass filamentary reinforcing elements 44 are shown parallel to one another, each carcass filamentary reinforcing element 44 makes an angle $A_{C2}$ greater than or equal to 85° with the circumferential direction Z of the tyre 10' in the equatorial circumferential plane E of the tyre 10', in other words in each sidewall 22.

In this example, it is adopted by convention that an angle oriented in the anticlockwise direction from the reference straight line, in this case the circumferential direction Z, has a positive sign and that an angle oriented in the clockwise direction from the reference straight line, in this case the circumferential direction Z, has a negative sign. In this instance, $A_{C1}=+67°$ and $A_{C2}=+90°$.

With reference to FIG. 11, the single working ply 18 comprises a plurality of working filamentary reinforcing elements 46. The working filamentary reinforcing elements 46 are arranged side by side in a manner substantially parallel to one another. Each working filamentary reinforcing element 46 extends axially from one axial end of the working reinforcement 15 of the tyre 10 to the other axial end of the working reinforcement 15 of the tyre 10. Each working filamentary reinforcing element 46 makes an angle $A_T$ greater than or equal to 10°, preferably ranging from 30° to 50° and more preferably from 35° to 45°, with the circumferential direction Z of the tyre 10' in the median plane M. Given the orientation defined above, $A_T=-40°$.

The single hooping ply 19 comprises at least one hooping filamentary reinforcing element 48. In this instance, the hooping ply 19 comprises a single hooping filamentary reinforcing element 48 wound continuously over an axial width $L_F$ of the crown 12 of the tyre 10' such that the axial distance between two adjacent windings is equal to 1.3 mm. Advantageously, the axial width $L_F$ is less than the width $L_T$ of the working ply 18. The hooping filamentary reinforcing element 48 makes an angle $A_F$ strictly less than 10° with the circumferential direction Z of the tyre 10', preferably less than or equal to 7°, and more preferably less than or equal to 5°. In this instance, $A_F=+5°$.

The hooping ply 19 has a secant modulus in tension equal to 430 daN·mm$^{-1}$ for a force equal to 15% of the force at break of the hooping ply. The force at break of the hooping ply is equal to 69 daN·mm$^{-1}$.

It will be noted that the carcass filamentary reinforcing elements 44, working filamentary reinforcing elements 46 and hooping filamentary reinforcing elements 48 are arranged, in the crown 12, so as to define a triangle mesh in projection onto the equatorial circumferential plane E in the radial direction of the tyre. In this case, the angle $A_F$ and the fact that the orientation of the angle $A_T$ and the orientation of the angle $A_{C1}$ are opposite with respect to the circumferential direction Z of the tyre 10' make it possible to obtain this triangle mesh.

Each carcass filamentary reinforcing element 44 is a textile filamentary element and conventionally comprises two multifilament strands, each multifilament strand being made up of a spun yarn of polyester, in this case PET, monofilaments, these two multifilament strands being individually overtwisted at 240 turns·m$^{-1}$ in one direction and then twisted together at 240 turns·m$^{-1}$ in the opposite direction. These two multifilament strands are wound in a helix around one another. Each of these multifilament strands has a count equal to 220 tex.

Each working filamentary reinforcing element 46 is a metal filamentary element and in this case is an assembly of two steel monofilaments that each have a diameter equal to 0.30 mm, the two steel monofilaments being wound together at a pitch of 14 mm.

The hooping filamentary reinforcing element 48 is obtained by embedding the cord 50 or 50' in an elastomeric matrix based on the elastomeric composition of the hooping ply 19.

The tyre 10' is manufactured by implementing a method similar to the method for manufacturing the tyre 10. In order to form the triangle mesh of the tyre 10', a specific assembly method is implemented, as described in EP1623819 or in FR1413102.

Comparative Tests

Various cords A to V intended for reinforcing a tyre for passenger vehicles and various cords A' to J' intended for reinforcing a tyre for industrial vehicles were tested.

Among the cords A to V, the following are distinguished:

the cords A, F and J, which are not in accordance with the invention and were obtained by implementing a conventional cabling assembly method of the prior art, the cord V, which corresponds to the metal cord 3.26 described in WO2016/166056, this cord V not being in accordance with the invention and being obtained by implementing a conventional twisting assembly method of the prior art, the cords B, D, G, I, K, S, T and U, which are not in accordance with the invention and were obtained by implementing the prior art method described in WO2016083265 and WO2016083267, the cords C, E, H, L, M, N, O, P, Q and R, which are in accordance with the invention and were obtained by implementing the prior art method described in WO2016083265 and WO2016083267, the cords Q and O being the above-described cords 50 and 50', respectively.

Among the cords A' to J', the following are distinguished:

the cords A' and E', which are not in accordance with the invention and were obtained by implementing a conventional cabling or twisting assembly method of the prior art, the cords B', F' and H', which are not in accordance with the invention and were obtained by implementing the prior art method described in WO2016083265 and WO2016083267, the cord D', which is not in accordance with the invention and was obtained by implementing a method of preforming each metal filamentary element followed by a cabling assembly step, the cords C', G', I' and J', which are in accordance with the invention and were obtained by implementing the prior art method described in WO2016083265 and WO2016083267.

For each metal cord, the following were measured: the diameter Df of each metal filamentary element, expressed in millimetres, the number N of metal filamentary elements, the pitch factor K equal to the ratio of the pitch P to Df, the helix angle α expressed in degrees, the pitch P of each metal filamentary element, expressed in millimetres, the helix diameter Dh, expressed in millimetres, the enclosure diameter Dv, expressed in millimetres, the helix radius of curvature Rf, expressed in millimetres, the ratio Rf/Df, the ratio Dv/Df, the structural elongation As, expressed in %, the diameter D of the cord, expressed in millimetres, and a compressibility indicator $\varepsilon_c$ determined as follows.

The compressibility indicator $\varepsilon_c$ is measured on a test specimen with a rectangular section with an area of 12 mm×8 mm and with a height equal to 20 mm. The test specimen comprises an elastomeric matrix which has, in the cured state, a modulus equal to 10 MPa (in this case a modulus representative of the modulus of the compositions used in tyres—in other fields, other moduli could be envisaged) and in which the metal cord to be tested is embedded such that the axis of the cord is coincident with the axis of symmetry of the test specimen. Two support plates with an area of 20 mm×20 mm are adhesively bonded to each face of the rectangular section of the test specimen, each face having been carefully ground beforehand. Each support plate is then connected to a test machine having a movable crosshead usable in tension or in compression (machine from Zwick or Instron for example). The test specimen (resting on one of the 20 mm×20 mm plates) is placed on a support with a diameter of 30 mm having a horizontal support face, the support itself being fastened to a lower crosshead of the test machine. Positioned under the movable crosshead of the machine is a load sensor carrying a second support with a diameter equal to 30 mm, the support face of which, which is also horizontal, is positioned facing the first support face. The distance that separates the two horizontal supports is therefore variable as per the movement of the movable crosshead. This distance takes, as first value, a value such that the test specimen can fit without load between the two supports with a diameter of 30 mm, then takes a second value for exerting a preload of 0.1 N, and will then decrease to a speed of 3 mm/mn until the end of the test, which is stopped after the test specimen has been squashed by 10% of its initial height. The force-compression curve is obtained at 20° C. The contribution of the load of the matrix to the corresponding deformations is subtracted from the value of the load of the test specimen (starting from a force-compression curve of a single block made only of matrix). The value of maximum deformation at which buckling takes place, this being a critical deformation beyond which the load decreases when the test specimen bends, corresponds to the value of the maximum load, of this new curve. The compressibility indicator e, is equal to the value of this recorded critical deformation.

The results of all these measurements are collated in Tables 1 and 2 below. As regards the compressibility indicator $\varepsilon_c$, it is estimated that satisfactory longitudinal compressibility is obtained for values of $\varepsilon_c \geq 5$. The longitudinal compressibility is favoured all the more, the higher the value of ε. The indication NT indicates that the cord was not tested.

On comparing the cords A, B and C, it is noted that the cord A has a lower longitudinal compressibility and a larger diameter D than the cord C. Specifically, the helix radius of curvature Rf of the cord A is relatively high, making it sensitive to buckling. Although the cord B has a diameter D smaller than the cord C, its longitudinal compressibility is insufficient, in particular since the helix radius of curvature Rf and the enclosure diameter Dv are too small, bringing the metal filamentary elements too close to the axis of the cord and making them liable to buckling.

On comparing the cords D, E and V, it is noted that, although the cord D has a suitable helix radius of curvature Rf, the enclosure diameter is too small, this certainly making the cord very compact but nevertheless very incompressible longitudinally, unlike the cord E according to the invention. The cord V, although having a relatively small diameter on account of the small number of metal filamentary elements, does not exhibit sufficient longitudinal compressibility.

On comparing the cords F, G, H and I, it is noted that, although the cords G and I have relatively small diameters, they are nevertheless very incompressible longitudinally on account of a particularly small enclosure diameter Dv, to a lesser extent for the cord I, on account of the relatively high helix radius of curvature Rf. The cord F has the double defect of a relatively large diameter and low longitudinal compressibility.

On comparing the cords J, K, L, M, N and O, it is noted that, on account of a relatively large helix radius of curvature Rf, the cord J has low longitudinal compressibility. It is noted that, for a number of threads greater than or equal to that of the cord J, the cords M, N and O all have a smaller diameter and much better compressibility. Although the cord K has a relatively small diameter, the cord K is only slightly longitudinally compressible on account of its too small enclosure diameter.

On comparing the cords P, Q, R, S, T and U, it is noted that the cord U has a diameter that is much too large compared with the cords P, Q and especially R, which are in accordance with the invention. The cords S and T, although having small diameters D, are very incompressible longitudinally, unlike the cords P, Q and especially R, the latter having a diameter similar to that of the cord S while having much greater longitudinal compressibility.

On comparing the cords A', B', C' and D', it is noted that the cord A' has a diameter D that is much too large and longitudinal compressibility that is too low. The cords B' and D', while being smaller, have the same defect of being very incompressible on account of an enclosure diameter Dv that is too small and of requiring, for the cord D', steps of preforming the metal filamentary elements. The cord C', even though it has a much larger diameter than that of the cords B' and D', exhibits good longitudinal compressibility.

On comparing the cords E', F', G', H', I' and J', it is noted that the cords E' and H' have a diameter D that is much too large, especially the cord H'. The cord F' has a diameter that is relatively small but at the cost of insufficient longitudinal compressibility. By contrast, the cords G', I' and J' exhibit an excellent compromise between diameter and longitudinal compressibility, in particular the cord J'.

TABLE 1

|   | Df | N | K | α | P | Dh | Dv | Rf | Rf/Df | Dv/Df | As | D | $\varepsilon_c$ |
|---|----|---|---|---|---|----|----|----|-------|-------|-----|---|-----|
| A | 0.20 | 5 | 45 | 11.8 | 9 | 0.60 | 0.40 | 7.16 | 35.8 | 1.99 | 1.4 | 0.80 | <5 |
| B | 0.20 | 5 | 18 | 20.2 | 3.6 | 0.42 | 0.22 | 1.77 | 8.8 | 1.11 | 1.6 | 0.62 | <5 |
| C | 0.20 | 5 | 25 | 17.9 | 5 | 0.51 | 0.31 | 2.72 | 13.6 | 1.57 | 2.5 | 0.78 | >5 |
| D | 0.26 | 6 | 25 | 15.7 | 6.4 | 0.57 | 0.31 | 3.91 | 15.1 | 1.20 | 0.4 | 0.82 | <5 |

TABLE 1-continued

|   | Df | N | K | α | P | Dh | Dv | Rf | Rf/Df | Dv/Df | As | D | $\varepsilon_c$ |
|---|----|---|---|---|---|----|----|----|-------|-------|----|---|------|
| E | 0.26 | 6 | 25 | 20.2 | 6.4 | 0.75 | 0.49 | 3.15 | 12.1 | 1.88 | 2.8 | 0.99 | >5 |
| F | 0.30 | 3 | 45 | 12.0 | 13.5 | 0.91 | 0.61 | 10.58 | 35.3 | 2.04 | 1.9 | 1.22 | <5 |
| G | 0.30 | 3 | 25 | 15.1 | 7.5 | 0.64 | 0.34 | 4.75 | 15.8 | 1.15 | 2.4 | 0.94 | <5 |
| H | 0.30 | 3 | 27 | 18.5 | 8 | 0.85 | 0.55 | 4.24 | 14.1 | 1.84 | 4.4 | 1.15 | >10 |
| I | 0.30 | 3 | 18 | 20.1 | 5.4 | 0.63 | 0.33 | 2.67 | 8.9 | 1.10 | 4.1 | 0.93 | <5 |
| J | 0.32 | 4 | 45 | 11.9 | 14.5 | 0.97 | 0.65 | 11.45 | 35.8 | 2.04 | 1.7 | 1.30 | <5 |
| K | 0.32 | 4 | 25 | 15.2 | 8 | 0.69 | 0.37 | 5.04 | 15.7 | 1.16 | 1.9 | 1.01 | <5 |
| L | 0.32 | 3 | 25 | 17.9 | 8 | 0.82 | 0.50 | 4.36 | 13.6 | 1.57 | 3.9 | 1.15 | 9 |
| M | 0.32 | 4 | 25 | 18.1 | 8 | 0.83 | 0.51 | 4.32 | 13.5 | 1.60 | 3.4 | 1.15 | 6 |
| N | 0.32 | 5 | 25 | 18.0 | 8 | 0.83 | 0.51 | 4.34 | 13.6 | 1.59 | 2.6 | 1.15 | 5.5 |
| O | 0.32 | 6 | 25 | 17.9 | 8 | 0.82 | 0.50 | 4.36 | 13.6 | 1.57 | 1.6 | 1.15 | 5.2 |
| P | 0.32 | 4 | 25 | 19.3 | 8 | 0.89 | 0.57 | 4.09 | 12.8 | 1.79 | 4.1 | 1.20 | 6.5 |
| Q | 0.32 | 4 | 25 | 20.4 | 8 | 0.95 | 0.63 | 3.90 | 12.2 | 1.97 | 4.8 | 1.27 | 7 |
| R | 0.32 | 4 | 25 | 16.4 | 8 | 0.75 | 0.43 | 4.71 | 14.7 | 1.34 | 2.5 | 1.07 | 5.5 |
| S | 0.32 | 4 | 25 | 15.2 | 8 | 0.69 | 0.37 | 5.04 | 15.7 | 1.16 | 1.9 | 1.01 | 3.5 |
| T | 0.32 | 4 | 25 | 13.3 | 8 | 0.60 | 0.28 | 5.69 | 17.8 | 0.88 | 1.1 | 0.93 | 3.5 |
| U | 0.32 | 4 | 25 | 21.0 | 8 | 0.98 | 0.66 | 3.81 | 11.9 | 2.05 | 5.2 | 1.29 | NT |
| V | 0.26 | 3 | 29 | 9.2 | 7.5 | 0.39 | 0.13 | 7.57 | 29.1 | 0.49 | 0.5 | 0.65 | <5 |

TABLE 2

|   | Df | N | K | α | P | Dh | Dv | Rf | Rf/Df | Dv/Df | As | D | $\varepsilon_c$ |
|---|----|---|---|---|---|----|----|----|-------|-------|----|---|------|
| A' | 0.38 | 5 | 45 | 12.0 | 17.1 | 1.16 | 0.78 | 13.40 | 35.3 | 2.04 | 1.5 | 1.54 | <5 |
| B' | 0.38 | 5 | 25 | 15.0 | 9.5 | 0.81 | 0.43 | 6.05 | 15.9 | 1.13 | 1.1 | 1.19 | <5 |
| C' | 0.38 | 5 | 25 | 19.9 | 9.5 | 1.10 | 0.72 | 4.71 | 12.4 | 1.90 | 3.7 | 1.47 | >5 |
| D' | 0.38 | 5 | 18 | 21.7 | 6.7 | 0.84 | 0.46 | 3.12 | 8.2 | 1.22 | 2.3 | 1.22 | <5 |
| E' | 0.46 | 5 | 45 | 11.4 | 20.5 | 1.39 | 0.93 | 16.06 | 34.9 | 2.02 | 1.5 | 1.84 | <5 |
| F' | 0.46 | 5 | 25 | 13.4 | 11.4 | 0.97 | 0.51 | 7.26 | 15.8 | 1.11 | 1.1 | 1.43 | <5 |
| G' | 0.46 | 5 | 25 | 18.8 | 11.4 | 1.32 | 0.86 | 5.65 | 12.3 | 1.87 | 3.8 | 1.78 | >5 |
| H' | 0.46 | 5 | 23 | 23.7 | 10.4 | 1.54 | 1.08 | 4.34 | 9.4 | 2.34 | 6.8 | 2.05 | NT |
| I' | 0.46 | 5 | 23 | 19.9 | 10.4 | 1.28 | 0.82 | 4.93 | 10.7 | 1.78 | 4.1 | 1.75 | >5 |
| J' | 0.46 | 5 | 23 | 15.5 | 10.4 | 1.01 | 0.55 | 5.93 | 12.9 | 1.20 | 1.7 | 1.50 | >5 |

The invention claimed is:

1. A cord comprising a single layer of helically wound metal filamentary elements,
   each metal filamentary element of the single layer describing, when the cord extends in a substantially rectilinear direction, a helical path about a main axis substantially parallel to the substantially rectilinear direction, such that, in a section plane substantially perpendicular to the main axis, a distance between the center of each metal filamentary element of the single layer and the main axis is equal to half a helix diameter Dh and is substantially constant and identical for all the metal filamentary elements of the single layer,
   the metal filamentary elements defining an internal enclosure of a cord of diameter Dv, and
   each metal filamentary element having a diameter Df and a helix radius of curvature Rf defined by Rf=P/(π×Sin (2α)), where P is a pitch of each metal filamentary element expressed in millimeters and α is a helix angle of each metal filamentary element,
   wherein, with Dh, Dv, Df and Rf being expressed in millimeters 9≤Rf/Df≤30 and 1.30≤Dv/Df≤2.10, where Dv=Dh−Df.

2. The cord according to claim 1, wherein 11≤Rf/Df≤19.

3. The cord according to claim 1, wherein 1.30≤Dv/Df≤2.05.

4. The cord according to claim 1, wherein the helix radius of curvature Rf is such that 2 mm≤Rf≤7 mm.

5. The cord according to claim 1, wherein the helix diameter Dh of each metal filamentary element is such that 0.40 mm≤Dh≤1.50 mm.

6. The cord according to claim 1, wherein 0.10 mm≤Df≤0.50 mm.

7. The cord according to claim 1, wherein Dv≥0.46 mm.

8. The cord according to claim 1, wherein each metal filamentary element is wound at a pitch P such that 3 mm≤P≤15 mm.

9. The cord according to claim 1, wherein the cord has a diameter D such that D≤2.00 mm.

10. The cord according to claim 1, wherein a ratio K of the pitch P to the diameter Df of each metal filamentary element, P and Df being expressed in millimeters, is such that 19≤K≤44.

11. The cord according to claim 1, wherein the helix angle α of each metal filamentary element is such that 13°≤α≤21°.

12. The cord according to claim 1, wherein the cord has a structural elongation As such that As≥1%, the structural elongation As being determined by applying the standard ASTM D2969-04 of 2014 to the cord so as to obtain a force-elongation curve, and the structural elongation As being equal to elongation, in %, corresponding to a maximum gradient of a force-elongation curve.

13. A semifinished product comprising an elastomeric matrix in which the cord according to claim 1 is embedded.

14. A tire comprising a filamentary reinforcing element obtained by embedding the cord according to claim 1 in an elastomeric matrix.

15. The tire according to claim 14, wherein the tire comprises a crown comprising a tread and a crown reinforcement, two sidewalls, two beads, and a carcass reinforcement that is anchored in each of the beads and extends in the sidewalls and in the crown, each sidewall connecting each bead to the crown, the crown reinforcement extending in the crown in a circumferential direction of the tire, the crown reinforcement being radially interposed between the carcass reinforcement and the tread, and the crown reinforcement comprising the filamentary reinforcing element.

* * * * *